United States Patent
Crow et al.

(10) Patent No.: US 12,393,103 B2
(45) Date of Patent: *Aug. 19, 2025

(54) DOOR ASSEMBLIES FOR IMAGE CAPTURE DEVICES

(71) Applicant: GoPro, Inc., San Mateo, CA (US)

(72) Inventors: Kielan C. Crow, San Mateo, CA (US); Juntao Sun, Shenzhen (CN); Matt Baker, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,189

(22) Filed: Jun. 12, 2024

(65) Prior Publication Data

US 2024/0329495 A1    Oct. 3, 2024

Related U.S. Application Data

(63) Continuation of application No. 17/638,160, filed as application No. PCT/US2020/050479 on Sep. 11, 2020, now Pat. No. 12,066,748.

(60) Provisional application No. 62/901,953, filed on Sep. 18, 2019.

(51) Int. Cl.
  *G03B 17/08*    (2021.01)
(52) U.S. Cl.
  CPC ........ *G03B 17/08* (2013.01); *G03B 2217/002* (2013.01); *G03B 2217/007* (2013.01)

(58) Field of Classification Search
  CPC .............. G03B 17/08; G03B 2217/002; G03B 2217/007
  See application file for complete search history.

(56) References Cited

U.S. PATENT DOCUMENTS

| | | | | |
|---|---|---|---|---|
| 8,199,251 | B2* | 6/2012 | Woodman | H04N 23/60 348/81 |
| 2006/0042920 | A1* | 3/2006 | Kubo | G03B 17/08 200/302.1 |
| 2010/0194975 | A1* | 8/2010 | Murakami | H04N 23/51 348/373 |
| 2019/0179214 | A1* | 6/2019 | Hara | H05K 5/03 |

* cited by examiner

*Primary Examiner* — Ahmed A Berhan
(74) *Attorney, Agent, or Firm* — Young Basile Hanlon & MacFarlane, P.C.

(57) ABSTRACT

An image capture device is disclosed that includes a body defining a peripheral cavity and a removable door assembly that is configured to close and seal the peripheral cavity. The door assembly includes a door body; a locking mechanism; and a biasing member that is configured for engagement with the locking mechanism to resist unlocking of the locking mechanism until a threshold force is applied, at which time, the biasing member is moved from a normal position, in which the biasing member extends at a first angle in relation to the locking mechanism, to a deflected position, in which the biasing member extends at a second angle in relation to the locking mechanism. When locked, the door assembly is rotationally fixed in relation to the body of the image capture device, and when unlocked, the door assembly is rotatable in relation to the body of the image capture device.

20 Claims, 21 Drawing Sheets

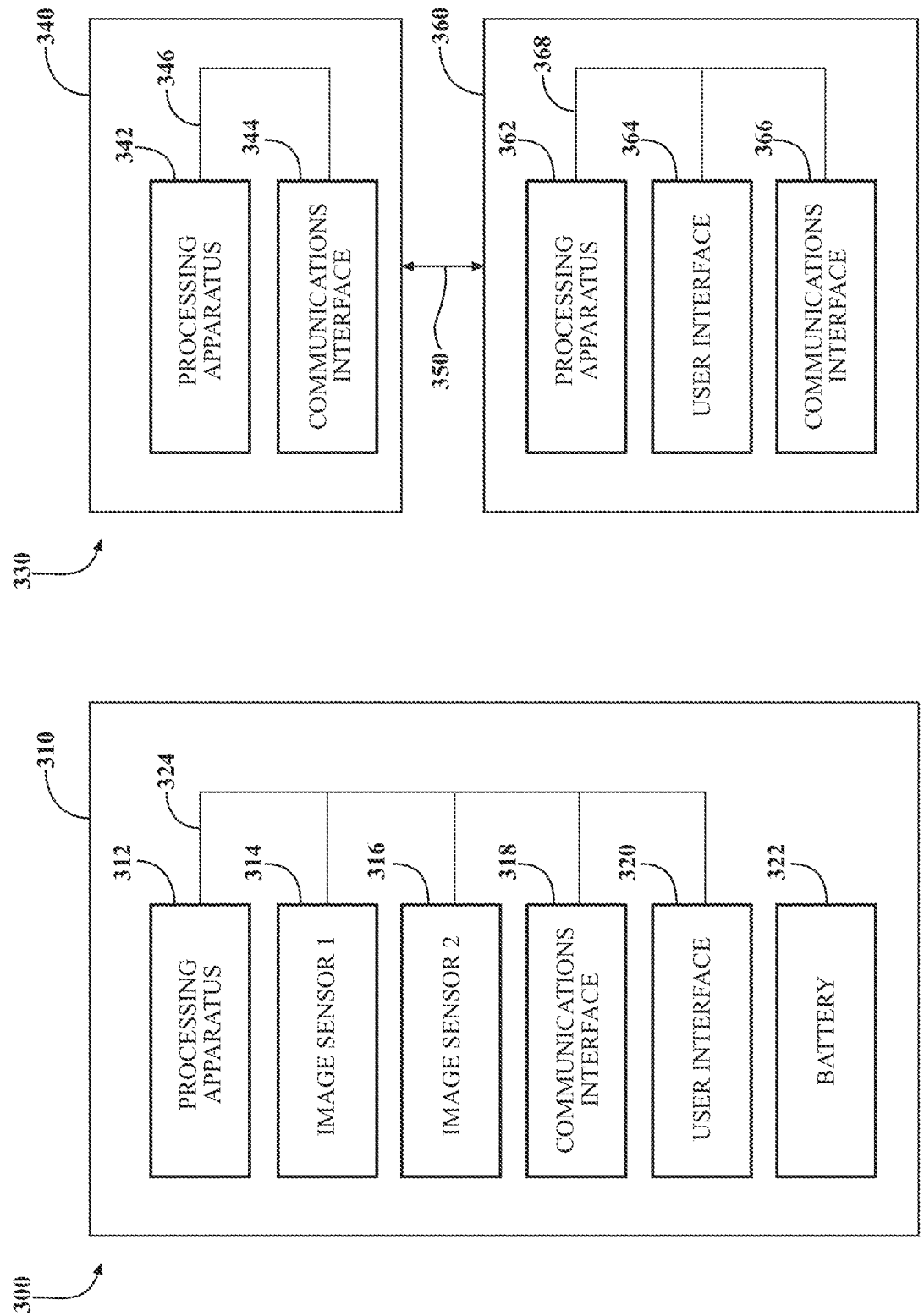

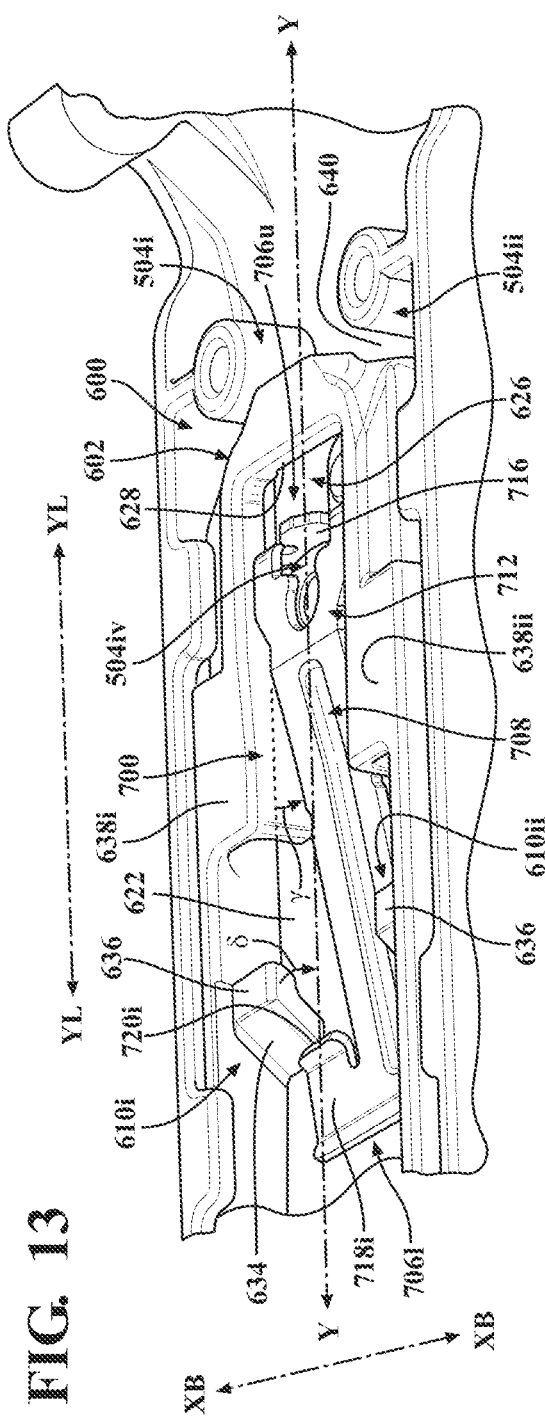
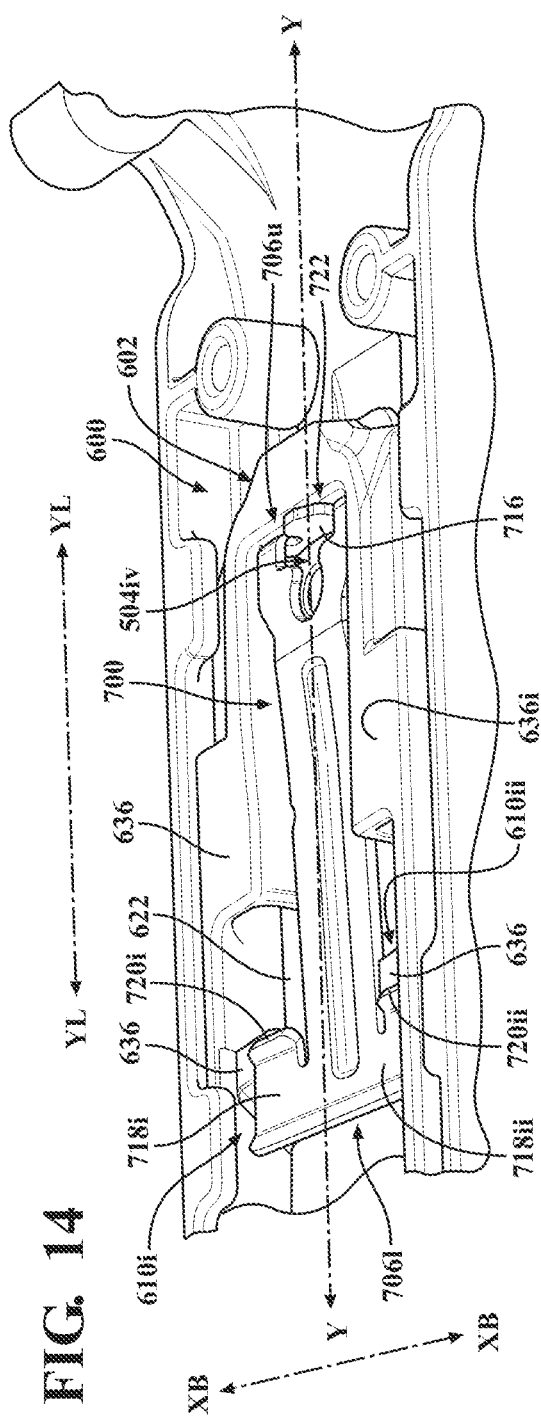
FIG. 13
FIG. 14

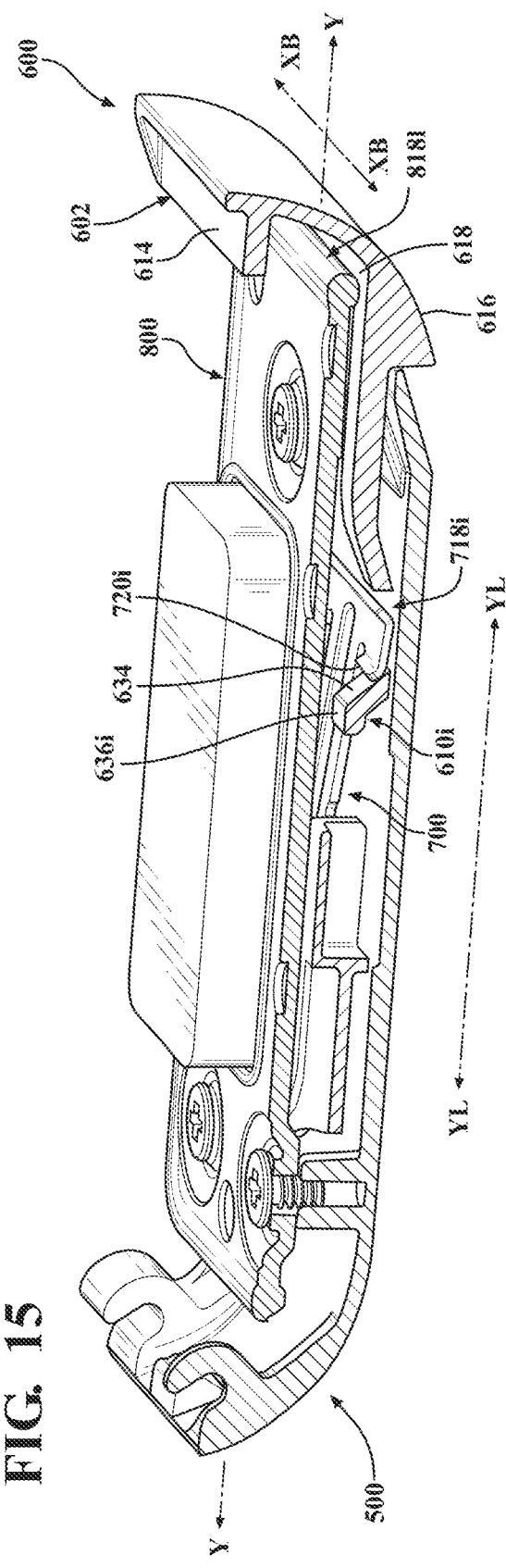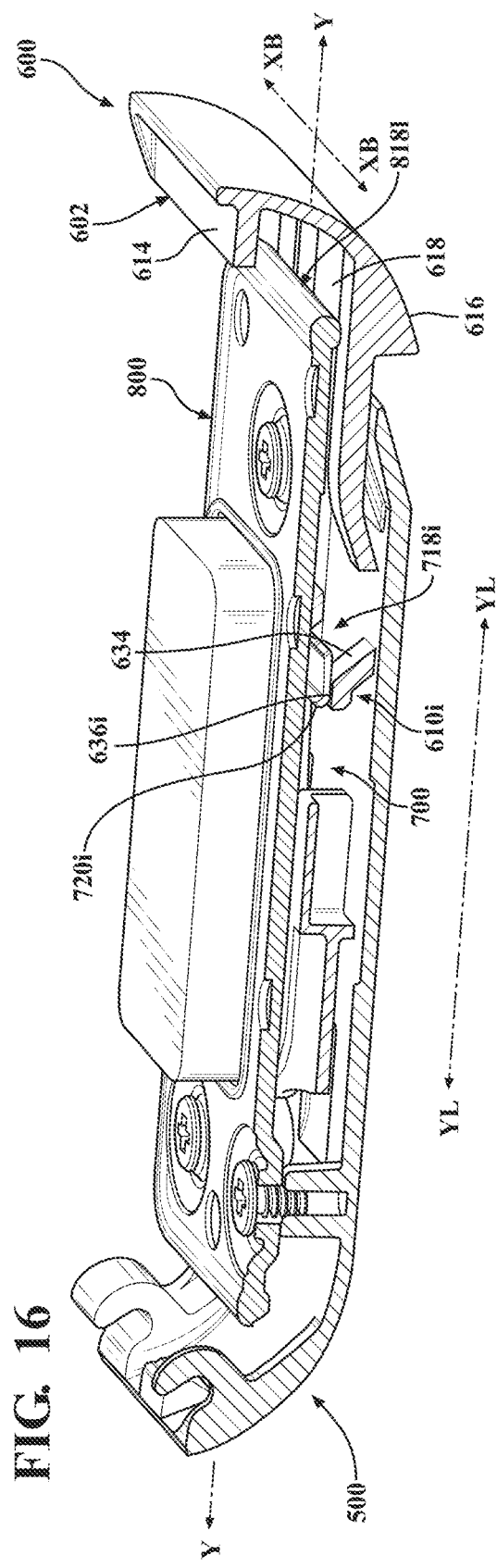

DOOR ASSEMBLIES FOR IMAGE CAPTURE DEVICES

CROSS-REFERENCE TO RELATED APPLICATIONS

This application is a continuation of U.S. patent application Ser. No. 17/638,160, filed Feb. 24, 2022, which is a 371 of International Application No. PCT/US2020/050479, filed on Sep. 11, 2020, which claims priority to U.S. Provisional Application No. 62/901,953, filed on Sep. 18, 2019, the entire disclosures of which are hereby incorporated by reference.

TECHNICAL FIELD

The present disclosure relates generally to image capture devices, and, more specifically, to an image capture device including a removable door assembly that is repositionable between closed and open positions to conceal, protect, and expose interior components of the image capture device.

BACKGROUND

Image capture devices typically include a plurality of doors that are used to conceal various internal components, such as, for example, a power source for the image capture device (e.g., one or more batteries); one or more accessory ports; an I/O interface; USB-C connectors; etc. The inclusion of multiple doors, however, requires multiple seals (one for each door), and presents an elevated risk that water and/or debris may enter the image capture device. Additionally, in known image capture devices, the doors are often fixedly connected to (i.e., non-removable from) a body of the image capture device.

To address these concerns, the present disclosure describes image capture devices that include a single, removable door including an integrated sealing member.

SUMMARY

In one aspect of the present disclosure, an image capture device is disclosed that includes a body defining a peripheral cavity, and a door assembly that is configured to close and seal the peripheral cavity. The door assembly is movable (repositionable) between an open position and a closed position, and includes a door body with an engagement structure that is configured for removable connection to the body of the image capture device; a locking mechanism that is slidable in relation to the door body between a locked position and an unlocked position; and a biasing member that is configured for engagement with the locking mechanism to resist movement of the locking mechanism from the locked position to the unlocked position until a threshold force is applied to the locking mechanism. In the locked position, the door assembly is rotationally fixed in relation to the body of the image capture device to inhibit movement of the door assembly from the closed position to the open position, and in the unlocked position, the door assembly is rotatable in relation to the body of the image capture device to allow for movement of the door assembly from the closed position to the open position. The biasing member is configured for movement between a normal position and a deflected position upon the application of the threshold force. In the normal position, the biasing member extends at a first angle in relation to the locking mechanism, and in the deflected position, the biasing member extends at a second, greater angle in relation to the locking mechanism.

In certain embodiments, the biasing member may be configured for contact with the locking mechanism to define a range of relative motion between the locking mechanism and the door body. In certain embodiments, the locking mechanism may include a deflector that is configured for engagement with the biasing member such that the biasing member traverses the deflector during movement of the locking mechanism between the normal position and the deflected position. In certain embodiments, the deflector may define an angled surface that is configured to facilitate movement of the biasing member between the normal position and the deflected position. In certain embodiments, the biasing member may include a generally T-shaped configuration defining a first wing and a second wing. In certain embodiments, the deflector may include a first deflector that is configured for engagement with the first wing and a second deflector that is configured for engagement with the second wing. In certain embodiments, the engagement structure may be configured to rotatably connect and axially fix the door body to the body of the image capture device such that the door assembly is rotatable in relation to the body of the image capture device during movement between the open position and the closed position. In certain embodiments, the locking mechanism may include a locking member that is configured for engagement with a receptacle defined by the body of the image capture device. In certain embodiments, the locking member may be positioned within the receptacle when the locking mechanism is in the locked position and may be separated from the receptacle when the locking mechanism is in the unlocked position. In certain embodiments, the biasing member may extend in generally parallel relation to a longitudinal axis of the door assembly in the deflected position. In certain embodiments, the biasing member may be axially fixed to the door body such that the locking mechanism is slidable in relation to the biasing member during movement between the locked position and the unlocked position. In certain embodiments, the door assembly may further include a sealing member that is connected to the door body such that the locking mechanism and the biasing member are positioned between the door body and the sealing member. In certain embodiments, the sealing member may include a resilient material and may be positioned such that the sealing member is compressed within the peripheral cavity during movement of the door assembly from the open position to the closed position to form a seal between the door assembly and the body of the image capture device when the door assembly is in the closed position. In certain embodiments, the locking mechanism may include a tactile member that is configured for engagement by a user such that the locking mechanism is manually movable from the locked position to the unlocked position. In certain embodiments, the image capture device may further include one or more of a power source; an accessory port; an I/O interface; and a USB-C connector. In certain embodiments, the power source, the accessory port, the I/O interface, and/or the USB-C connector may be positioned for access via the peripheral cavity when the door assembly is in the open position. It is envisioned that the image capture device described above may include any combination of features and elements described in this paragraph.

In another aspect of the present disclosure, a door assembly is disclosed for an image capture device. The door assembly includes a door body that is configured for removable connection to the image capture device; a locking mechanism that is connected to the door body to lock and unlock the door assembly such that the door assembly is movable in relation to and is removable from the image capture device; a biasing member; and a sealing member. The locking mechanism is movable along an axis of movement that extends in generally parallel relation to a longitudinal axis of the door assembly. The biasing member is configured for engagement with the locking mechanism to resist movement of the locking mechanism until a threshold force is applied to the locking mechanism, whereupon the biasing member is movable from a first position to a second position along an axis of movement that extends in generally orthogonal relation to a longitudinal axis of the door assembly. The sealing member is configured to sealingly engage the image capture device upon closure of the door assembly and is secured to the door body such that the locking mechanism and the biasing member are positioned between the door body and the sealing member.

In certain embodiments, the locking mechanism may be movable between a first position, in which the door assembly is inhibited from rotating relative to the body of the image capture device, and a second position, in which the door assembly is freely rotatable in relation to the body of the image capture device. In certain embodiments, the locking mechanism may include a locking member that is configured for engagement with the image capture device when the locking mechanism is in the first position. In certain embodiments, the locking member may be disengageable from the image capture device as the locking mechanism moves from the first position to the second position. In certain embodiments, the biasing member may be configured such that the biasing member extends at a first angle in relation to the locking mechanism when the locking mechanism is in the first position and at a second, greater angle in relation to the locking mechanism when the locking mechanism is in the second position. In certain embodiments, the biasing member may be axially fixed to the door body such that the locking mechanism is movable in relation to the biasing member as the locking mechanism moves between the first position and the second position. It is envisioned that the door assembly described above may include any combination of features and elements described in this paragraph.

In another aspect of the present disclosure, a method of assembling an image capture device including a door assembly is disclosed. The method includes assembling a locking mechanism and a door body of the door assembly such that the locking mechanism is slidable in relation to the door body to lock and unlock the door assembly; axially fixing a biasing member to the door body such that the locking mechanism is positioned for contact with the biasing member, and such that the locking mechanism is slidable in relation to the biasing member upon application of a threshold force to the locking mechanism; connecting a sealing member to the door body such that the locking mechanism and the biasing member are positioned between the door body and the sealing member, and such that the sealing member sealingly engages a body of the image capture device upon closure of the door assembly; and removably connecting the door assembly to a body of the image capture device such that the door assembly is rotatable in relation to the body of the image capture device, and such that a locking member defined by the locking mechanism is movable into, and out of, a corresponding receptacle defined by the body of the image capture device during locking and unlocking of the door assembly.

In certain embodiments, assembling the locking mechanism and the door body may include positioning the locking mechanism such that the locking mechanism is slidable in relation to the door body along an axis of movement that extends in generally parallel relation to a longitudinal axis of the door assembly. In certain embodiments, axially fixing the biasing member to the door body may include connecting the biasing member to the door body such that the biasing member is deflectable along an axis of movement that extends in generally orthogonal relation to the longitudinal axis of the door assembly upon application of the threshold force. It is envisioned that the method described above may include any combination of features, elements, and/or tasks described in this paragraph.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIGS. 3A-3B are block diagrams of examples of image capture systems.

FIG. 13 is a partial, top, perspective view of the door assembly (with the sealing member and the spacer removed) showing the locking mechanism in the locked position.

FIG. 14 is a partial, top, perspective view of the door assembly (with the sealing member and the spacer removed) showing the locking mechanism in the unlocked position.

FIG. 15 is a side, (vertical) cross-sectional view of the door assembly with the locking mechanism shown in the locked position.

FIG. 16 is a side, (vertical) cross-sectional view of the door assembly with the locking mechanism shown in the unlocked position.

DETAILED DESCRIPTION

Figure 1A:
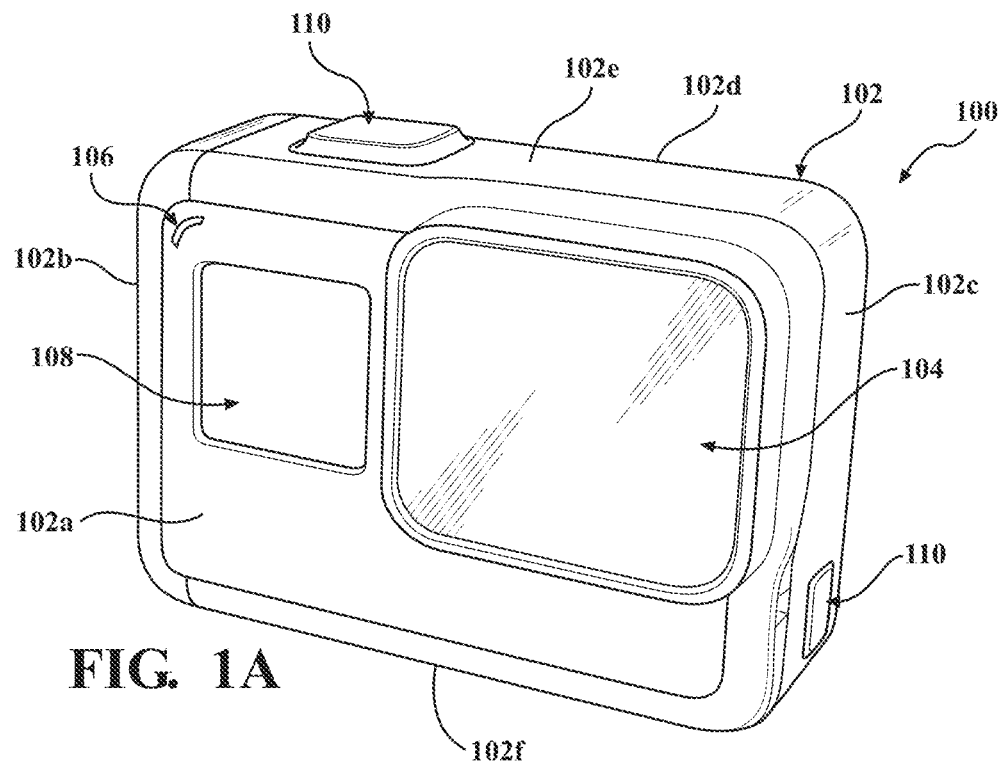
FIGS. 1A-1D are isometric views of an example of an image capture device.

The present disclosure describes image capture devices and various embodiments of door assemblies for use therewith. The door assemblies described herein are configured for removable connection to an image capture device, and are movable between open and closed positions to conceal and permit access to various internal components of the image capture device, including, for example, a power source (e.g., one or more batteries); one or more accessory ports; an I/O interface; USB-C connectors; etc. To guard against (if not entirely prevent) the entry of debris and/or water, the door assemblies described herein include a sealing member that is configured to form a (waterproof) seal with a body of the image capture device upon closure.

In addition to the sealing member, the door assemblies described herein include a locking mechanism that is movable (e.g., slidable) between locked and unlocked positions; a biasing member (e.g., a spring clip); a spacer; and a door body that supports the various components of the door assembly.

In the locked position, the locking mechanism engages the body of the image capture device to inhibit opening of the door assembly, and in the unlocked position, the locking mechanism is disengaged from the body of the image capture device to permit opening of the door assembly. The biasing member, however, acts upon the locking mechanism such that the locking mechanism remains in the locked position until the application of a threshold force thereto, thereby inhibiting (if not entirely preventing) inadvertent (e.g., accidental or unwanted) movement of the locking mechanism into the unlocked position (e.g., in the event that the image capture device is dropped), and, thus, inadvertent (e.g., accidental or unwanted) opening of the door assembly.

The spacer is supported by (e.g., is secured to) the sealing member to reduce (if not entirely eliminate) undesirable relative movement between the components of the door assembly. Additionally, or alternatively, the spacer may enhance the seal formed between the sealing member and the image capture device upon closure of the door assembly; increase shock absorption; and/or enhance electrical connectivity between the components of the image capture device.

FIGS. 1A-1D are isometric views of an example of an image capture device 100. The image capture device 100 may include a body 102 having a lens 104 structured on a front surface of the body 102, various indicators on the front surface of the body 102 (such as LEDs, displays, and the like), various input mechanisms (such as buttons, switches, and touchscreen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and an LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
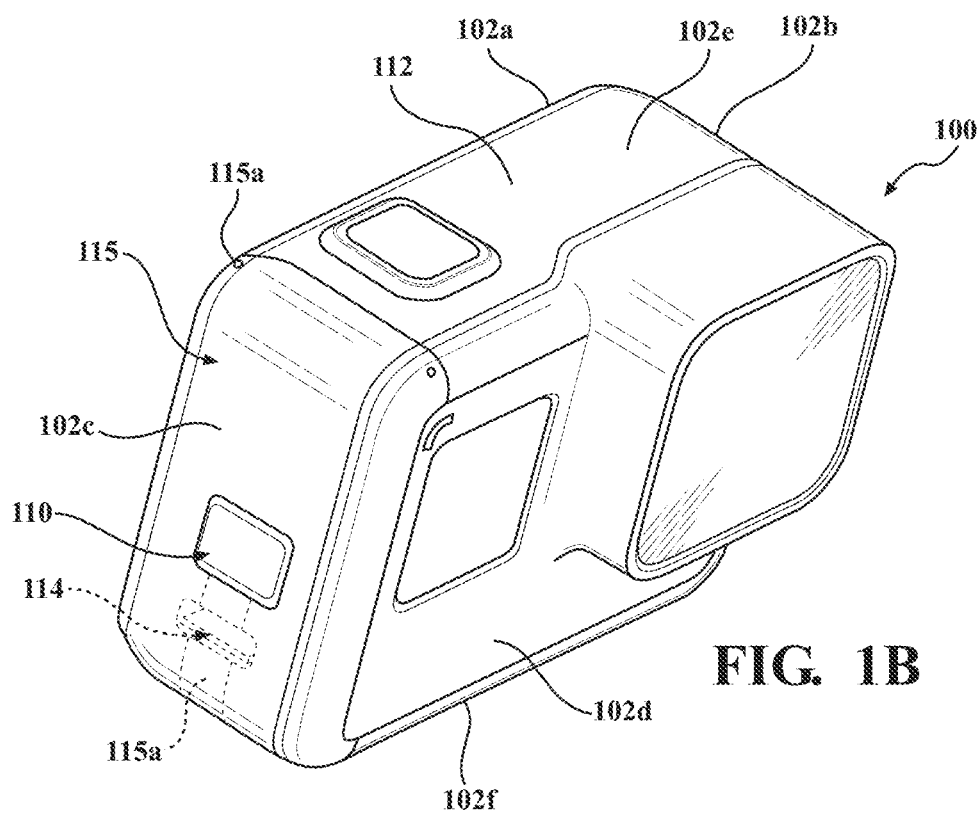
Figure 1C:
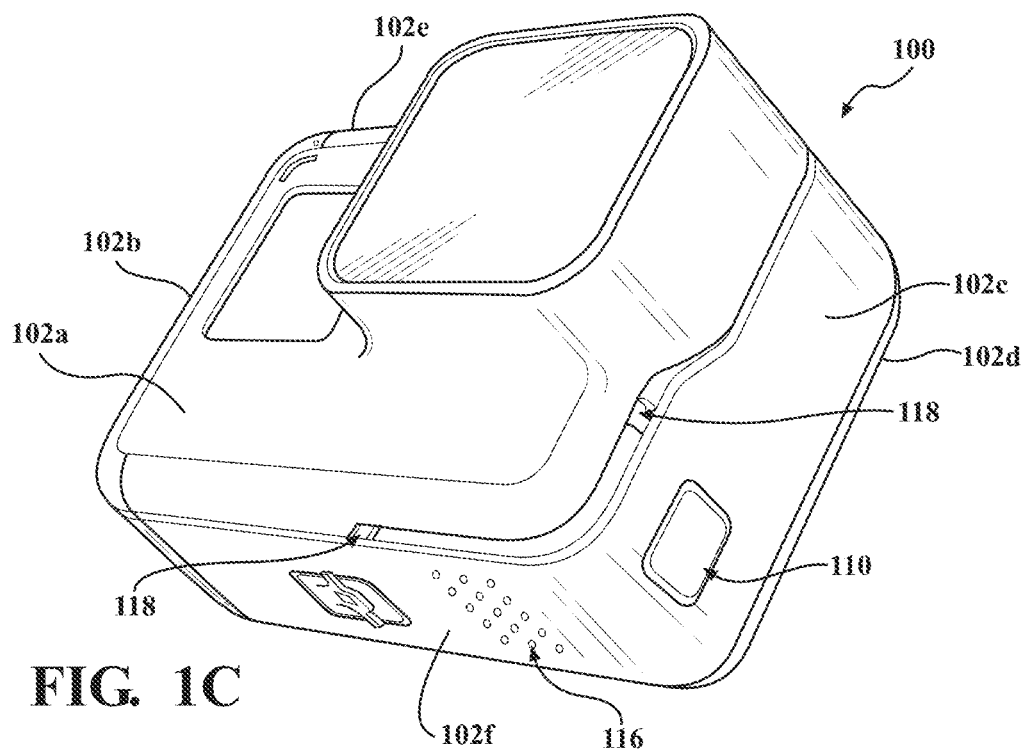
Figure 1D:
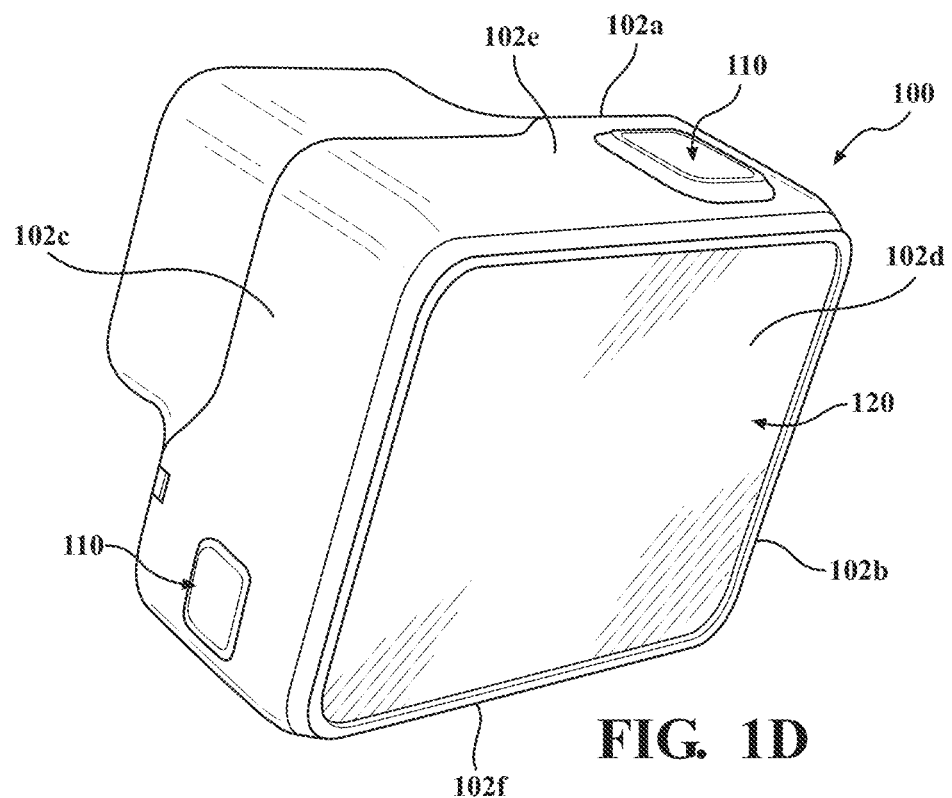

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to rotate (e.g., pivot) between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-1D includes an exterior that encompasses and protects internal electronics. In the present example, the exterior includes six surfaces (i.e., a front face 102a, side (left and right) faces 102b, 102c, a back face 102d, a top face 102e, and a bottom face 102f) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described herein. For example, the image capture device 100 may include additional buttons or different interface features, such as interchangeable lenses, cold shoes and hot shoes that can add functional features to the image capture device 100, etc.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device, or a network, such as the Internet, may be used.

In some implementations, the computing communication link may be a Wi-Fi link, an infrared link, a Bluetooth (BT) link, a cellular link, a ZigBee link, a near-field communications (NFC) link (such as an ISO/IEC 20643 protocol link), an Advanced Network Technology interoperability (ANT+) link, and/or any other wireless communications link or combination of links.

In some implementations, the computing communication link may be an HDMI link, a USB link, a digital video interface link, a display port interface link (such as a Video Electronics Standards Association (VESA) digital display interface link), an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
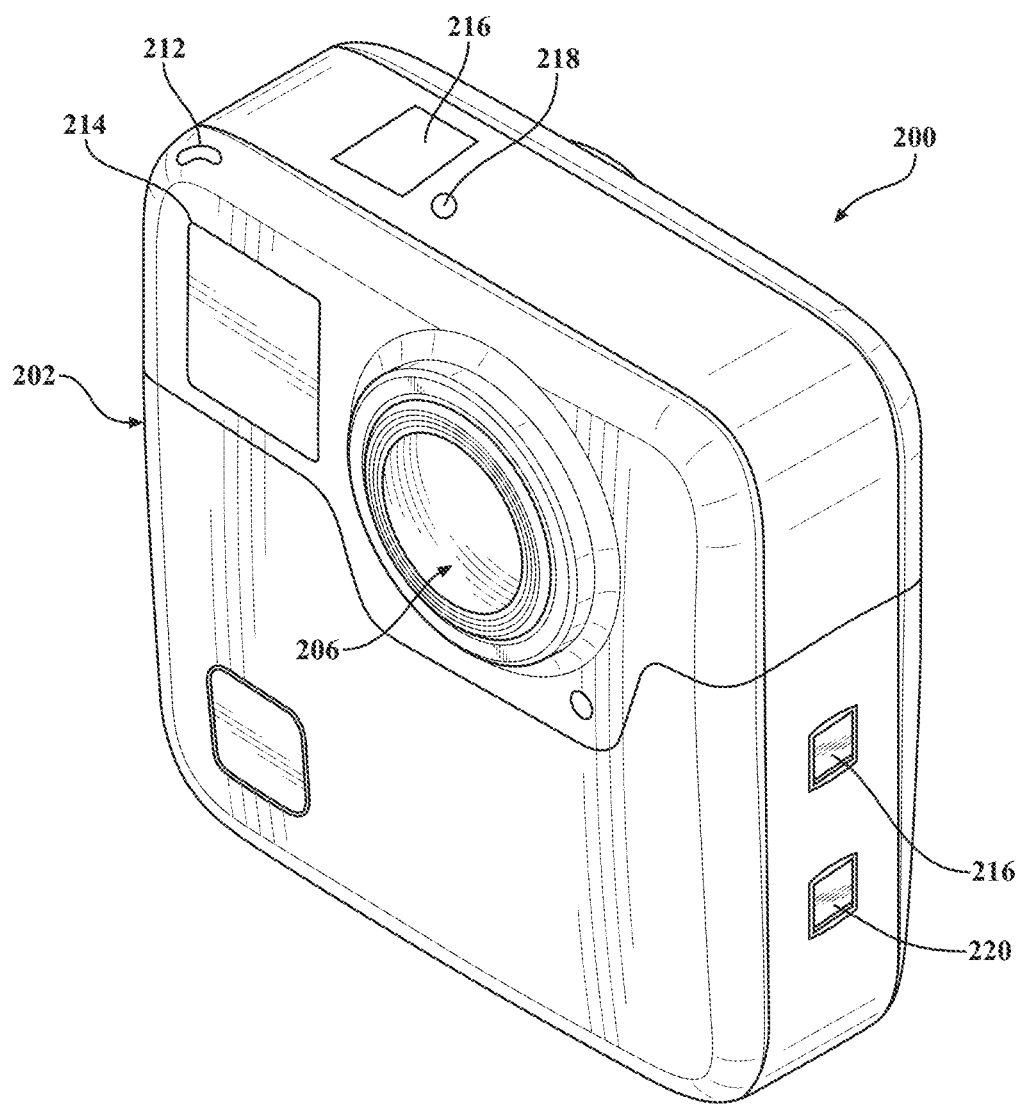
FIGS. 2A-2B are isometric views of another example of an image capture device.
Figure 2B:
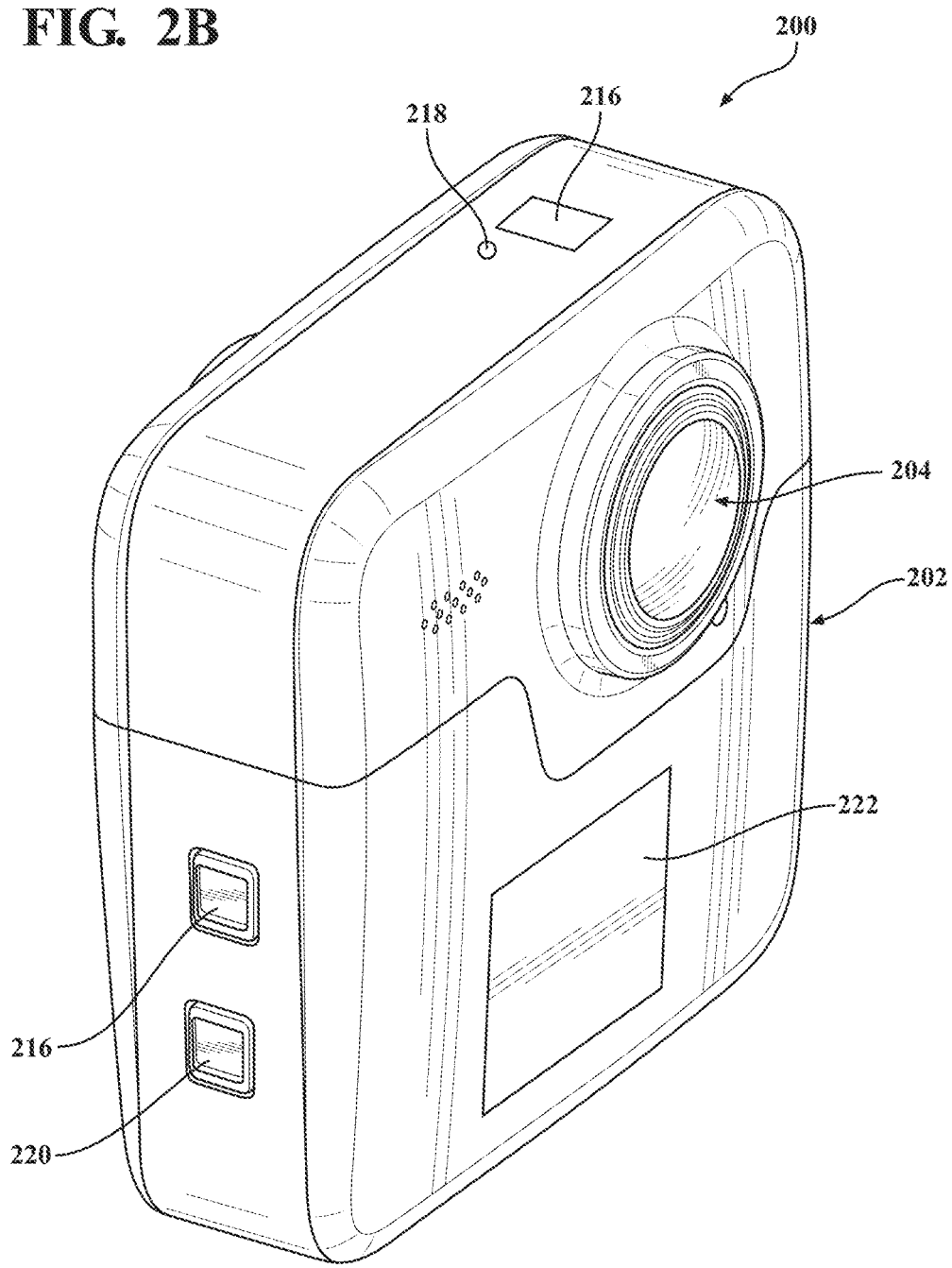

FIGS. 2A-2B illustrate another example of an image capture device 200. The image capture device 200 includes a body 202 and two camera lenses 204, 206 disposed on opposing surfaces of the body 202, for example, in a back-to-back or Janus configuration. Although generally depicted as a camera, it should be appreciated that the particular configuration of the image capture device 200 may be varied in alternate embodiments of the disclosure. For example, it is envisioned that the image capture device 200 may instead take the form of a cell phone.

The image capture device may include electronics (e.g., imaging electronics, power electronics, etc.) internal to the body 202 for capturing images via the lenses 204, 206 and/or performing other functions. The image capture device may include various indicators, such as an LED light 212 and an LCD display 214.

The image capture device 200 may include various input mechanisms, such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
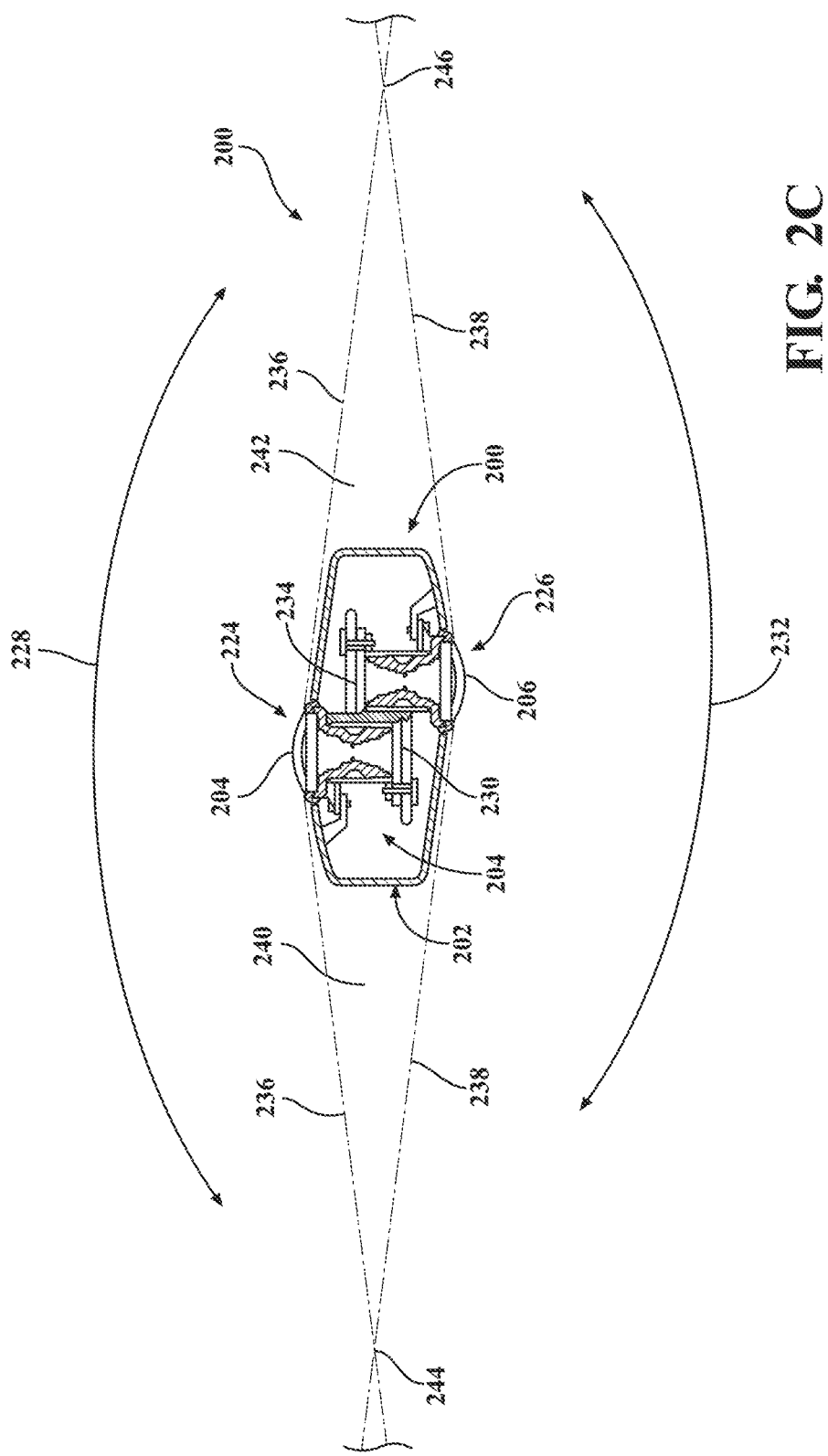
FIG. 2C is a cross-sectional view of the image capture device of FIGS. 2A-2B.

FIG. 2C is a cross-sectional view of an optical module 223 of the image capture device 200 of FIGS. 2A-2B. The optical module 223 facilitates the capture of spherical images, and, accordingly, includes a first image capture device 224 and a second image capture device 226. The first image capture device 224 defines a first field-of-view 228, as shown in FIG. 2C, and includes a first integrated sensor-lens assembly (ISLA) 229 that receives and directs light onto a first image sensor 230 via the lens 204. Similarly, the second image capture device 226 defines a second field-of-view 232, as shown in FIG. 2C, and includes a second ISLA 233 that receives and directs light onto a second image sensor 234 via the lens 206. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242, may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, the stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-3B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-2C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory (RAM) device, flash memory, or another suitable type of storage device, such as a non-transitory computer-readable memory. The memory of the processing apparatus 312 may include executable instructions and data that can be accessed by one or more processors of the processing apparatus 312.

For example, the processing apparatus 312 may include one or more dynamic random-access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields-of-view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may be used to implement some or all of the techniques described in this disclosure.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-1D. The personal computing device 360 may, for example, be the user interface device described with respect to FIGS. 1A-1D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device, such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure.

Figure 4A:
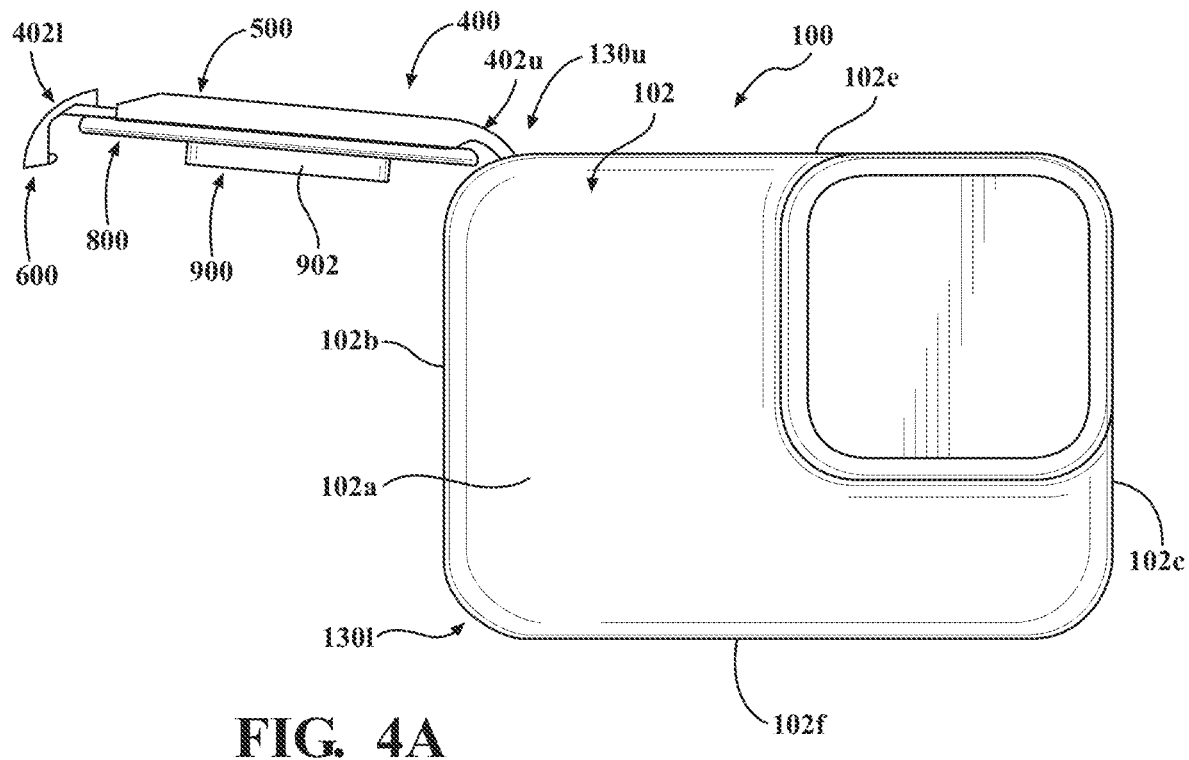
FIG. 4A is a front, plan view of the image capture device including a door assembly according to the principles of the present disclosure shown in an open position.
Figure 4B:
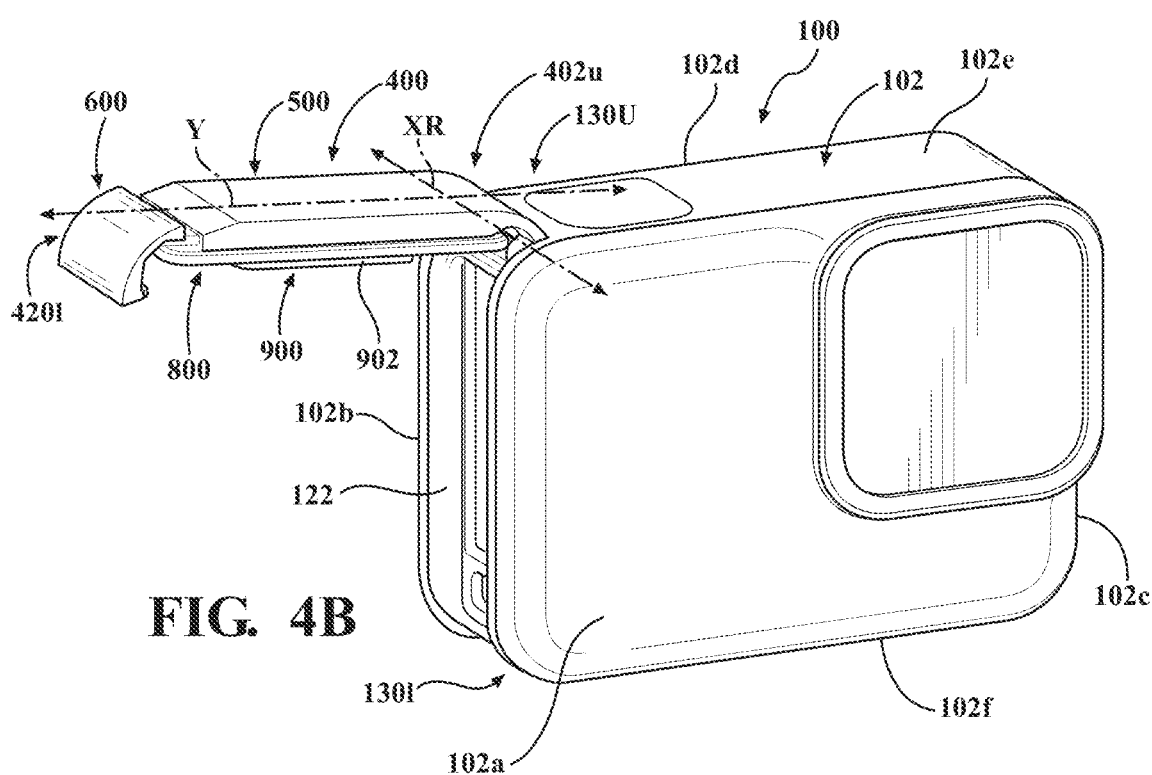
FIG. 4B is a front, perspective view of the image capture device with the door assembly shown in the open position.
Figure 4C:
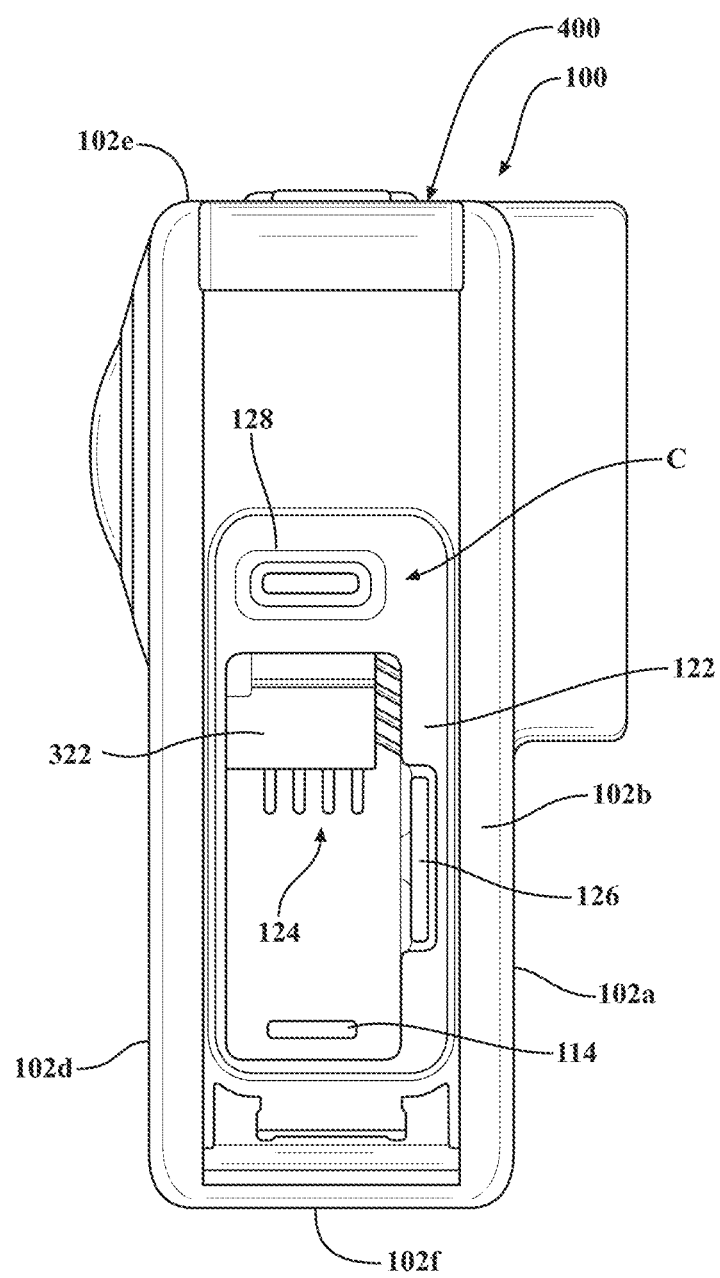
FIG. 4C is a side, plan view of the image capture device with the door assembly shown in the open position.
Figure 4D:
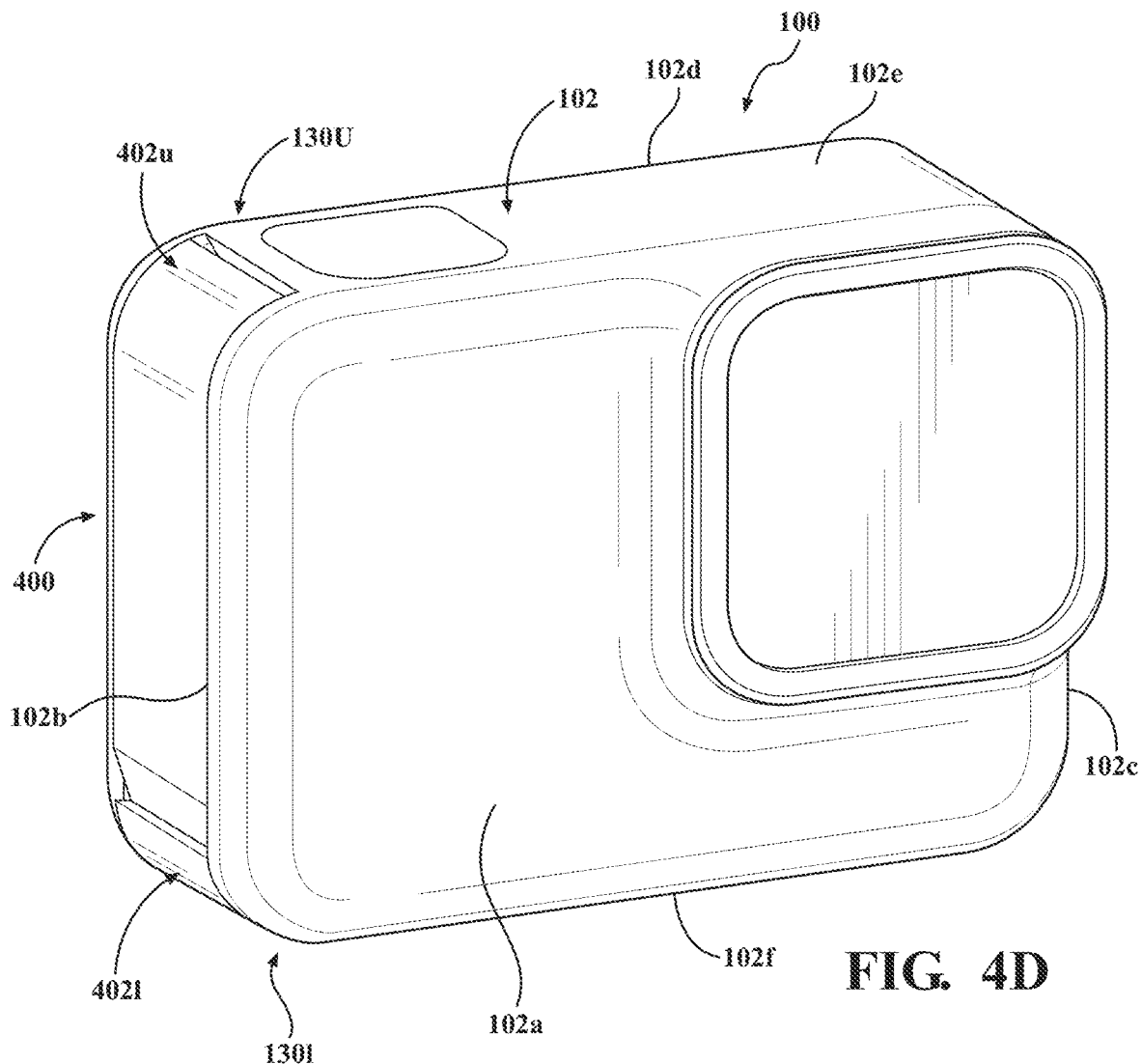
FIG. 4D is a front, perspective view of the image capture device with the door assembly shown in a closed position.

Referring now to FIGS. 4A-4D, a door assembly 400 will be discussed, which represents an alternate embodiment of the aforedescribed door 115 (FIG. 1B). More specifically, FIG. 4A provides a front, plan view of the image capture device 100 with the door assembly 400 shown in an open position; FIG. 4B provides a front, perspective view of the image capture device 100 with the door assembly 400 shown in the open position; FIG. 4C provides a side, plan view of the image capture device 100 with the door assembly 400 shown in the open position; and FIG. 4D provides a front, perspective view of the image capture device 100 with the door assembly 400 shown in the closed position. Although generally discussed in connection with the image capture device 100 hereinbelow, it should be appreciated that the door assembly 400 may be configured for use with any image capture device, such as the various embodiments described herein (e.g., the aforedescribed image capture devices 200, 300).

The door assembly 400 is rotatably (e.g., pivotably) connected to the body 102 of the image capture device 100 such that the door assembly 400 is movable (repositionable) between the open position (FIGS. 4A-4C) and the closed position (FIG. 4D) to reveal and conceal a peripheral cavity 122 defined by the body 102 of the image capture device 100. As seen in FIG. 4C, the peripheral cavity 122 may include, accommodate, or otherwise provide access to one or more components C of the image capture device 100, including, for example, a power source 124 for the image capture device 100 (e.g., the aforementioned battery 322); an accessory port 126; the aforementioned I/O interface 114 (FIG. 1B); a USB-C connector 128; etc.

In the illustrated embodiment, the door assembly 400 completes the exterior of the image capture device 100, and extends along a side (e.g., the left face 102b) of the image capture device between opposite (upper and lower) corner sections 130u, 130l (e.g., between the top face 102e and the bottom face 102f) of the image capture device 100. More specifically, the door assembly 400 includes an upper (first) end 402u that is pivotably connected to the body 102 at (or adjacent to) the corner section 130u such that the upper end 402u is positioned proximate (e.g., adjacent) to the top face 102e of the image capture device 100, and a lower (second) end 402l that is positioned at (or adjacent to) the corner section 130l (when the door assembly 400 is in the closed position) such that the lower end 402l is positioned proximate (e.g., adjacent) to the bottom face 102f of the image capture device 100.

Figure 5:
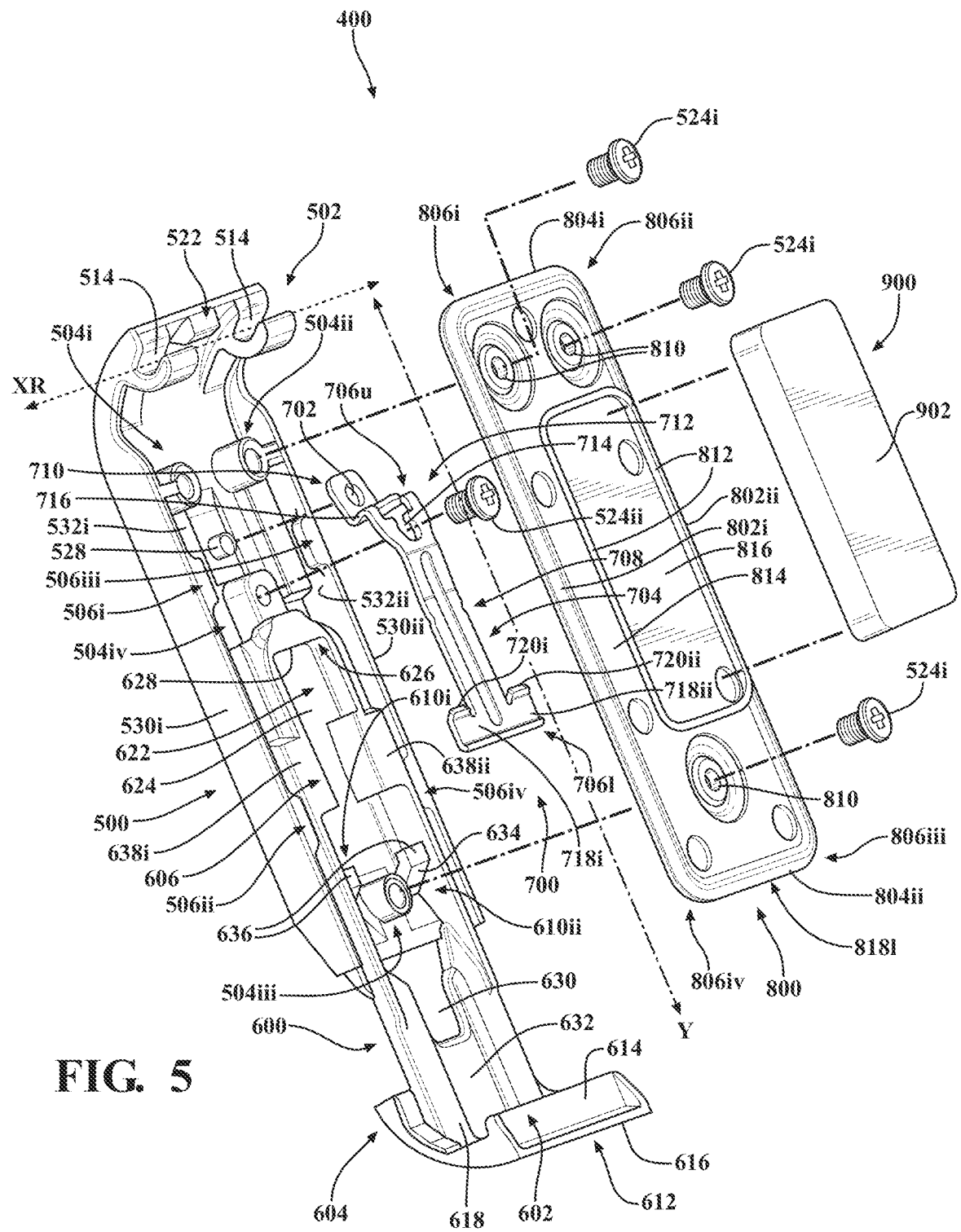
FIG. 5 is a perspective view of the door assembly shown separated from the image capture device with parts separated, which includes a door body; a locking mechanism; a biasing member; a sealing member; and a spacer.

FIG. 5 provides a perspective view of the door assembly 400 separated from the image capture device 100 with parts separated. As seen in FIG. 5, the door assembly 400 includes a door body 500; a locking mechanism 600; a biasing member 700 (e.g., a spring clip 702); a sealing member 800; and a spacer 900 that is supported by (e.g., secured to) the sealing member 800.

Figure 6:
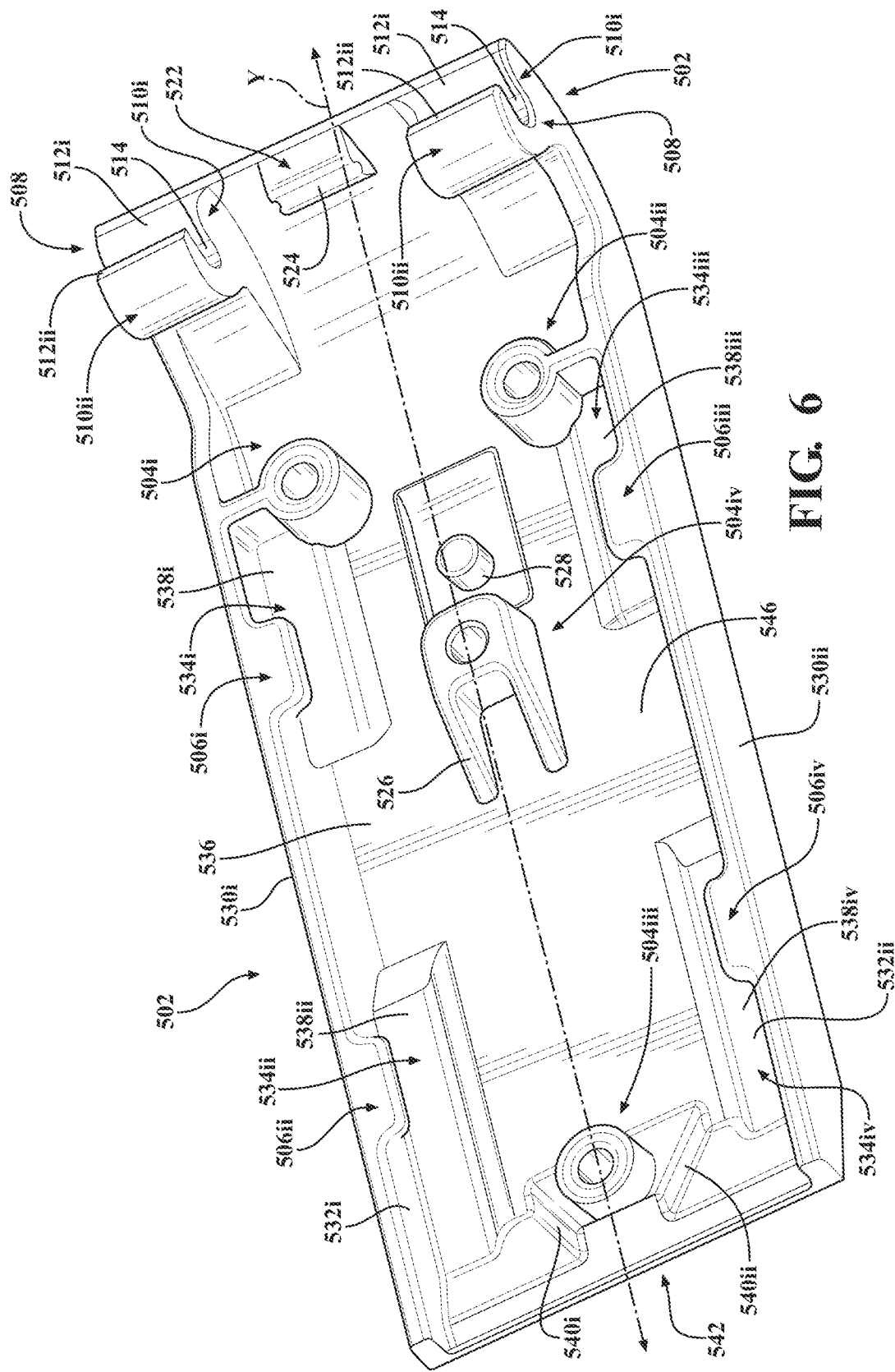
FIG. 6 is a bottom, perspective view of the door body.
Figure 7:
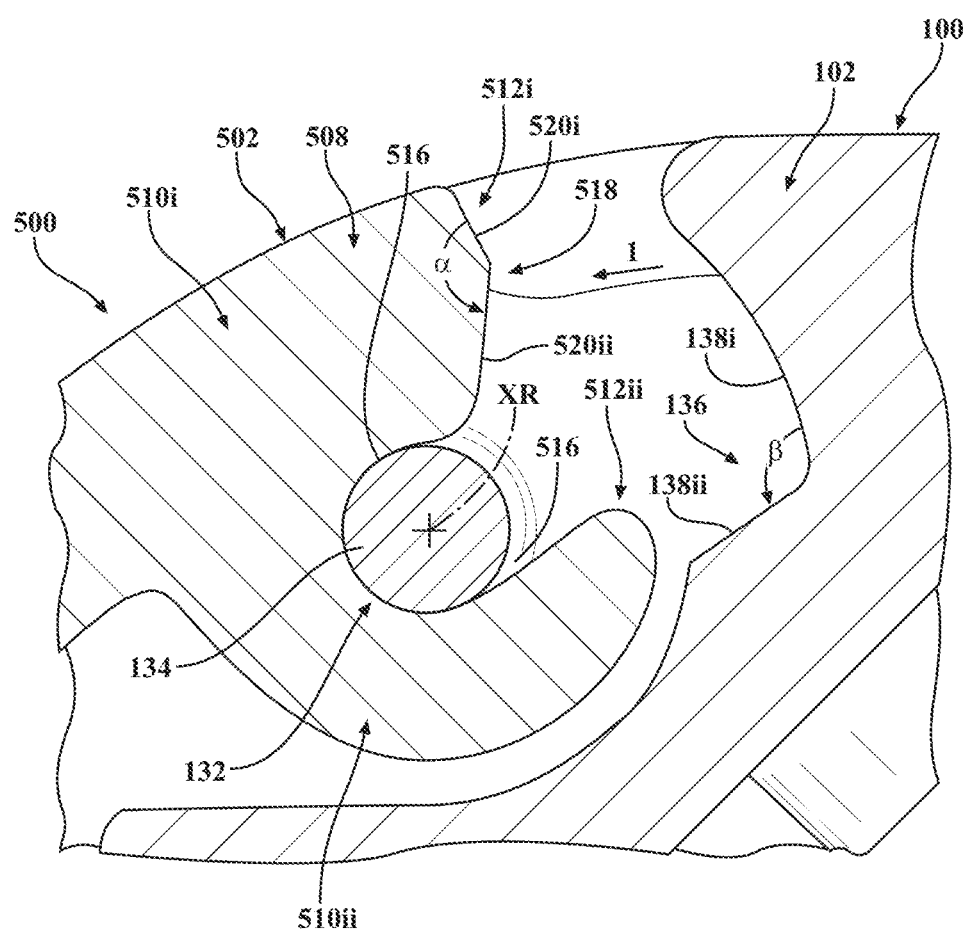
FIG. 7 is a partial, (vertical) cross-sectional view of the door body shown connected to the image capture device via a pivot member.

FIG. 6 provides a bottom, perspective view of the door body 500, and FIG. 7 provides a partial, (vertical) cross-sectional view of the door body 500 shown connected to the body 102 of the image capture device 100 via a pivot member 132 (e.g., a hinge pin 134). The door body 500 may include any suitable material or combination of materials, and may be formed through any suitable method of manufacture. In the particular embodiment shown throughout the figures, for example, the door body 500 includes a metallic material (e.g., stainless steel, aluminum, etc.), and is formed via injection molding. As discussed in detail below, the door body 500 includes an engagement structure 502; a plurality of bosses 504i-504iv that facilitate connection of the biasing member 700 and the sealing member 800 to the door body 500; and flanges 506 that support the locking mechanism 600.

The engagement structure 502 of the door body 500 is configured to facilitate connection of the door assembly 400 to the body 102 of the image capture device 100, and includes a pair of clips 508. Although shown as being integrally formed with the door body 500 in the illustrated embodiment, it should be appreciated that the engagement structure 502 may be formed as a separate, discrete component that is secured to the door body 500 (e.g., via adhesive, welding, etc.) without departing from the scope of the present disclosure.

The clips 508 are configured for engagement with the pivot member 132 (FIG. 7) to axially (vertically) fix the door body 500 in relation to the housing 102 of the image capture device 100 while allowing the door assembly 400 to rotate in relation to the body 102 during opening and closure. More specifically, the door assembly 400 is rotatable about an axis of rotation XR (FIGS. 4B, 5, 7) that extends through the pivot member 132, and through the clips 508.

The clips 508 are identical in configuration, and, as such, in the following description, reference may be made to a single clip 508 only in the interest of conciseness. Each clip 508 is generally C-shaped in configuration, and includes arms 510i, 510ii defining ends 512i, 512ii, respectively. The arms 510i, 510ii define a channel 514 (FIGS. 5-7) that is configured to receive the pivot member 132 such that the clip 508 is rotatable in relation to the pivot member 132 during opening and closure of the door assembly 400. For example, in certain embodiments, it is envisioned that each clip 508 may be configured to create an interference fit (e.g., a snap-fit) with the pivot member 132. The clip 508, however, is configured to create sufficient clearance with the pivot member 132 to allow for rotation of the clip 508 in relation to the pivot member 132 in the manner described herein.

To facilitate connection of the clips 508 to the pivot member 132, it is envisioned that the clips 508 may include a resilient (e.g., flexible) material, such as stainless steel, as mentioned above, such that the arm 510ii is deflected outwardly (i.e., away from the arm 510i) during connection to the pivot member 132, and is returned to its normal position (seen in FIGS. 5, 6) upon receipt of the pivot member 132 within the channel 514. To enhance the connection between the clip 508 and the pivot member 132, as seen in FIG. 7, the end 512i of the arm 510i includes an arcuate recess 516 with a configuration that corresponds to an outer contour defined by the pivot member 132 such that the pivot member 132 is seated within the recess 516 upon connection. As the pivot member 132 seats within the recess 516, due to the resilient (flexible) material used in construction of the clip 508, and the resultant deflection created during connection of the clip 508 to the pivot member 132, in certain embodiments, as the clip 508 returns to its normal position, it is envisioned that the clip 508 may provide an audible indication that the pivot member 132 has been properly connected to the clip 508.

As seen in FIG. 7, the end 512i of each clip 508 defines a bearing surface 518 that is configured for contact with a corresponding bearing surface 136 defined by the body 102 of the image capture device 100 within the peripheral cavity 122. More specifically, the bearing surface 518 of each clip 508 includes segments 520i, 520ii defining an obtuse angle α therebetween, and the bearing surface 136 includes corresponding segments 138i, 138ii defining an angle β therebetween of approximately 90°. It should be appreciated, however, that the configuration of the bearing surfaces 136, 518 (e.g., the values for the angles α, β) may be varied in alternate embodiments without departing from the scope of the present disclosure (e.g., depending upon the desired functionality of the door assembly 400).

When the door assembly 400 is in the open position (FIGS. 4A-4C), upon reaching a threshold orientation, continued rotation of the door assembly 400 will cause contact between the bearing surfaces 136, 518 to create a leverage effect that results in the application of an outwardly-directed force (in the direction indicated by arrow 1 (FIG. 7)) that will cause the clip 508 to separate from the pivot member 132, thus removing the door assembly 400 from the body 102 of the image capture device 100. For example, it is envisioned that the clips 508 may be configured such that the bearing surface 518 contacts the bearing surface 136 upon positioning of the door assembly 400 in generally orthogonal relation to the body 102 of the image capture device 100, as seen in FIGS. 4B, 4C, and that continued rotation of the door assembly 400 in relation to the body 102 of the image capture device 100 will cause detachment of the door assembly 400 from the image capture device 100.

As seen in FIGS. 5 and 6, the door assembly 400 further includes a detent 522 (e.g., a protrusion, protuberance, etc.) that facilitates connection of the door assembly 400 to the body 102 of the image capture device 100. More specifically, the detent 522 is positioned for contact with the pivot member 132 to urge the pivot member 132 into the channel 514 in each clip 508. To further promote proper connection of the door assembly 400 to the pivot member 132, and, thus, the image capture device 100, in certain embodiments, the detent 522 may include a groove (recess) 524 (FIG. 6) that is configured to receive (or otherwise accommodate) the pivot member 132.

During connection of the door assembly 400, it is envisioned that the pivot member 132 may experience resilient deflection (e.g., bending) via forces collectively applied to the pivot member 132 by the clips 508 and the detent 522. More specifically, it is envisioned that the pivot member 132 may be deflected towards the clips 508 by the detent 522 and may return to its normal (linear) position upon seating within the channel 514 defined by each clip 508. Additionally, it is envisioned that the forces applied to the pivot member 132 during connection of the door assembly 400 may further contribute to the audible indication created upon proper connection of the clips 508 to the pivot member 132 mentioned above.

With particular reference to FIGS. 5 and 6, the door body 500 includes bosses 504i, 504ii, 504iii, 504iv that are configured to receive corresponding fasteners 524 to secure the biasing member 700 and the sealing member 800 to the door body 500. More specifically, fasteners 524i extend through the sealing member 800 into the bosses 504i, 504ii, 504iii to fixedly connect the sealing member 800 to the door body 500, and a fastener 524ii extends through the boss 504iv to fixedly connect the biasing member 700 to the door body 500, as described in further detail below. Whereas the bosses 504i, 504ii, 504iii are each generally cylindrical in configuration, the boss 504iv defines an inclined surface 526 that is configured to support the biasing member 700 at an angle in relation to a longitudinal axis Y of the door assembly 400 (and in relation to the locking mechanism 600) in the manner described hereinbelow. To further secure the biasing member 700 to the door body 500, the door body 500 includes a post 528 that is configured for receipt within a corresponding opening 702 defined by the biasing member 700, further details of which are provided below.

Figure 8:
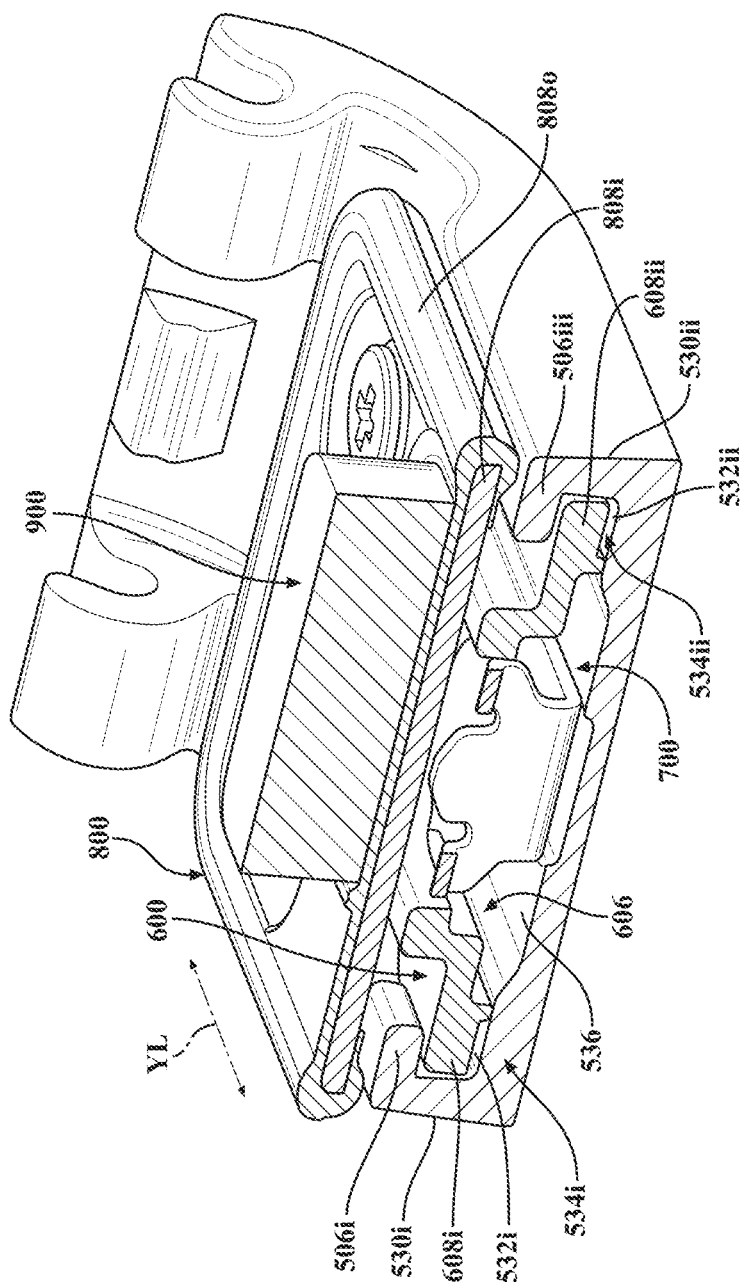
FIG. 8 is a (horizontal) cross-sectional view of the door assembly.

With reference to FIG. 8 as well, which provides a (horizontal) cross-sectional view of the door assembly 400, the flanges 506 extend inwardly from outer walls 530i, 530ii of the door body 500 so as to define channels 532i, 532ii that are configured to receive the locking mechanism 600. More specifically, in the illustrated embodiment, the door body includes a pair of flanges 506i, 506ii that extend inwardly from the outer wall 530i, and a pair of flanges 506iii, 506iv that extend inwardly from the outer wall 530ii. It should be appreciated, however, that the number of flanges 506 may be varied in alternate embodiments without departing from the scope of the present disclosure. For example, embodiments in which the door body 500 includes a single (e.g., more elongate) flange 506 on each outer wall 530 would also be within the scope of the present disclosure, as would embodiments including three or more flanges 506 on each outer wall 530.

In certain embodiments, such as that shown throughout the figures, the door body 500 may further include a plurality of supports 534 that extend inwardly from an inner surface 536 of the door body 500 (i.e., towards the sealing member 800) to collectively define the channels 532i, 532ii with the flanges 506. More specifically, in the illustrated embodiment, the door body 500 includes four supports 534i-534iv configured as support blocks 538i-538iv that are positioned in general registration (alignment) with the flanges 506i-506iv, respectively. It should be appreciated, however, that the configuration and/or the number of supports 534 included on the door body 500 may be varied in alternate embodiments without departing from the scope of the present disclosure, as discussed above in connection with the flanges 506. For example, embodiments in which supports 536 are configured as detents (or other such projections) would also be within the scope of the present disclosure, as would embodiments in which the door body 500 includes a pair of supports 534 that are positioned on opposite sides of the door body 500.

In certain embodiments, such as that seen in FIGS. 5 and 6, for example, the door body 500 may further include one or more stiffening ribs 540 (e.g., to reinforce and/or strengthen a lower (distal) end 542 of the door body 500. More specifically, in the illustrated embodiment, the door body 500 includes a pair of stiffening ribs 540i, 540ii positioned adjacent to the boss 504iii that extend vertically upward from the lower (distal) end 542 of the door body 500 at an angle to the outer walls 530i, 530ii, respectively. It should be appreciated, however, that the configuration, the orientation, and/or the number of ribs 540 included on the door body 500 may be varied in alternate embodiments without departing from the scope of the present disclosure. For example, embodiments including greater and fewer ribs 540 would also be within the scope of the present disclosure, as would embodiments including ribs 540 that extend in parallel and/or orthogonal relation to a length of the door body 500. Additionally, although shown as being integrally formed with the door body 500 in the illustrated embodiment, it should be appreciated that the ribs 540 may be formed as separate, discrete structures that may be secured to the door body 500 (e.g., via adhesive, welding, etc.) without departing from the scope of the present disclosure.

With reference now to FIGS. 5 and 8, the locking mechanism 600 will be discussed. The locking mechanism 600 may include any suitable material or combination of materials, and may be formed through any suitable method of manufacture. In the particular embodiment shown throughout the figures, for example, as discussed above in connection with the door body 500, the locking mechanism 600 includes a metallic material (e.g., stainless steel, aluminum, etc.), and is formed via injection molding. As discussed in detail below, the locking mechanism 600 includes a locking member 602; a tactile member 604; a body portion 606 including a pair of rails 608 (FIG. 8); and one or more deflectors 610.

Figure 9:
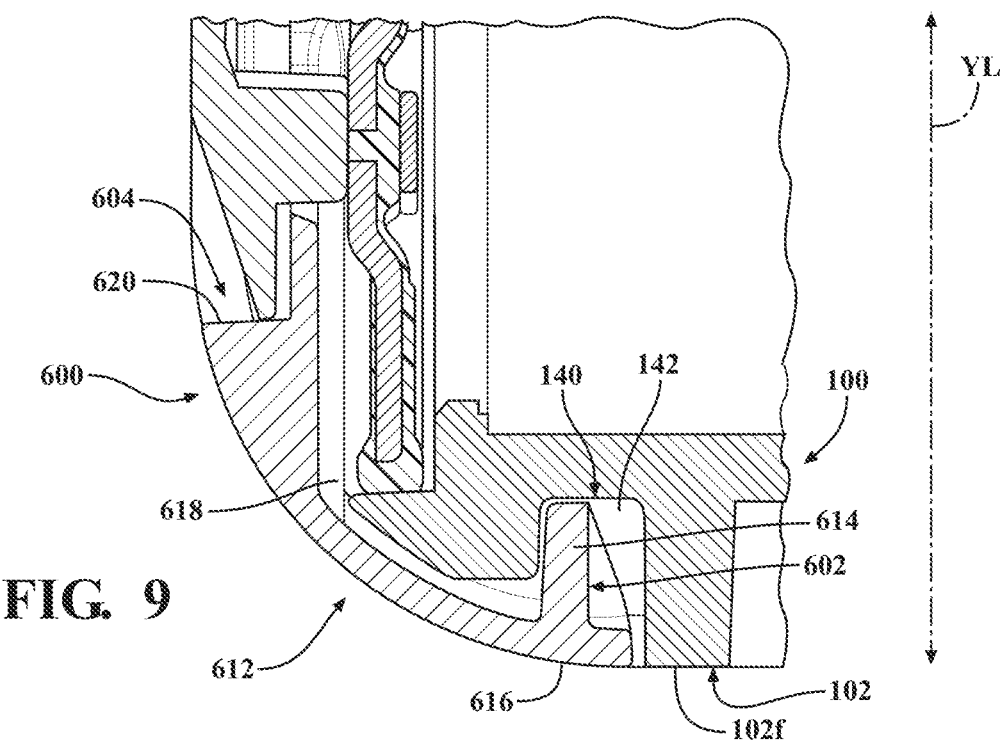
FIG. 9 is a partial, (vertical) cross-sectional view showing the locking mechanism in a locked position.
Figure 10:
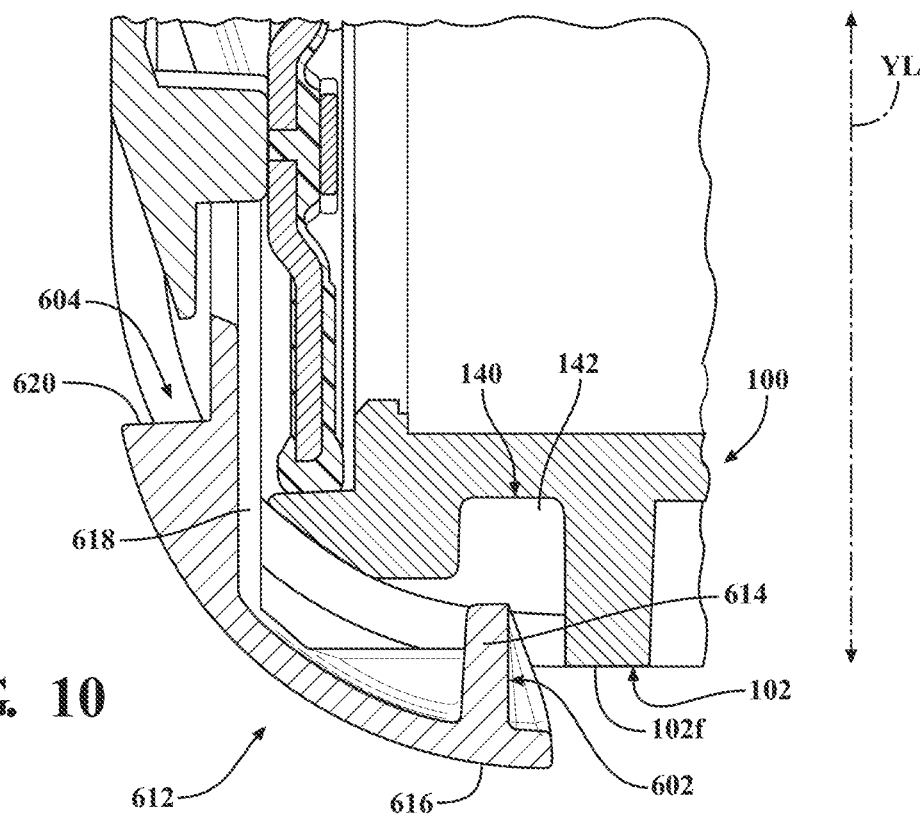
FIG. 10 is a partial, (vertical) cross-sectional view showing the locking mechanism in an unlocked position.
Figure 11:
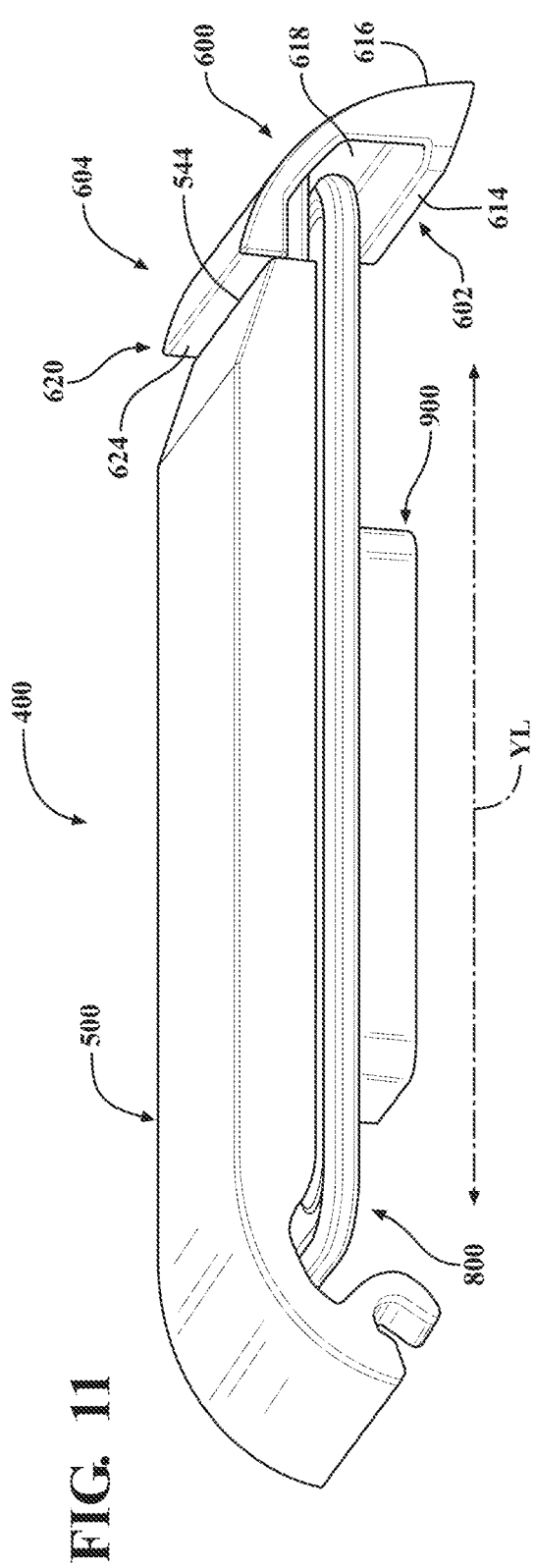
FIG. 11 is a side, perspective view of the door assembly with the locking mechanism shown in the locked position.
Figure 12:
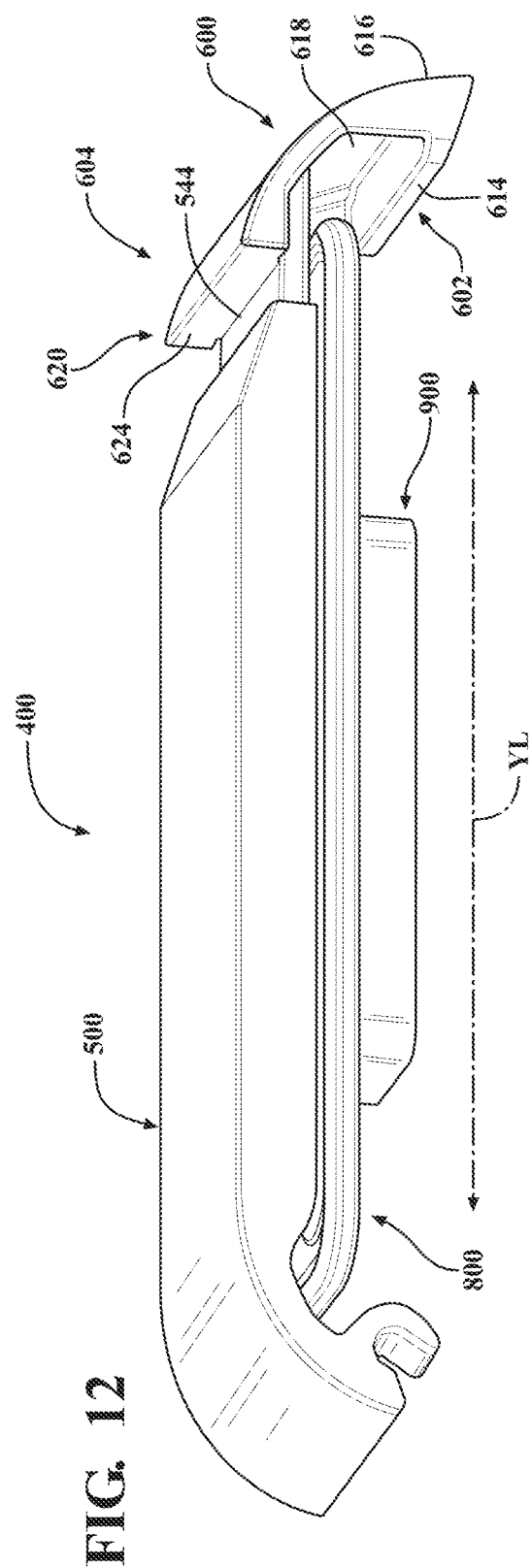
FIG. 12 is a side, perspective view of the door assembly with the locking mechanism shown in the unlocked position.

With reference to FIGS. 9-16 as well, the locking mechanism 600 is movable between locked and unlocked (first and second) positions along an axis of movement YL that extends in generally parallel relation to the longitudinal axis Y of the door assembly 400. More specifically, FIGS. 9 and 10 provide partial, (vertical) cross-sectional views showing the locking mechanism 600 in the locked and unlocked positions, respectively; FIGS. 11 and 12 provide side, perspective views of the door assembly 400 with the locking mechanism 600 shown in the locked position and the unlocked position, respectively; FIGS. 13 and 14 provide partial, top, perspective views of the door assembly 400 (with the sealing member 800 and the spacer 900 removed) showing the locking mechanism 600 in the locked and unlocked positions, respectively; and FIGS. 15 and 16 provide side, (vertical) cross-sectional views of the door assembly 400 with the locking mechanism 600 shown in the locked and unlocked positions, respectively.

In the locked position, the locking mechanism 600 engages with the housing 102 of the image capture device 100 to rotationally fix the door assembly 400 in relation to the housing 102, and, thus, maintain the door assembly 400 in the closed position. By contrast, in the unlocked position, the locking mechanism 600 is disengaged from the housing 102 of the image capture device 100 to permit rotation of the door assembly 400 in relation to the housing 102, and, thus, movement of the door assembly 400 into the open position.

With particular reference to FIGS. 9 and 10, the locking member 602 is positioned at a lower (distal) end 612 of the locking mechanism 600 (i.e., at the end of the locking mechanism 600 opposite to the pivot member 132), and is configured for insertion into, and removal from, a corresponding receptacle 140 in the housing 102 of the image capture device 100 such that the locking member 602 is engageable with, and disengageable from, the housing 102 during movement of the locking mechanism 600 between the unlocked and locked positions. More specifically, in the illustrated embodiment, the locking member 602 is configured as a tooth 614 that is configured for insertion into an opening 142 (e.g., a channel or other such surface irregularity) defined by the housing 102. It should be appreciated, however, that the particular configuration of the locking member 602 and the receptacle 140 may be varied in alternate embodiments without departing from the scope of the present disclosure. The locking member 602 extends upwardly (vertically) from an end wall 616 of the locking mechanism 600 in the direction of movement of the locking mechanism 600 in transitioning from the unlocked position to the locked position so as to define a groove 618 with the end wall 616. As seen in FIGS. 9 and 10, the end wall 616 is arcuate in configuration so as to match the overall exterior contour defined by the housing 102, whereby the end wall 616 sits flush with the bottom face 102*f* of the image capture device 100 when the locking mechanism 600 is in the locked position.

Referring to FIGS. 11 and 12 in particular, to facilitate movement between the locked position and the unlocked position, the locking mechanism 600 includes the tactile member 604, which is configured for manual engagement by a user such that a suitable force can be applied to the locking mechanism 600 to manually unlock the locking mechanism 600. For example, in the illustrated embodiment, the tactile member 604 is configured as an exterior flange 620 defining a finger grab 624. As seen in FIG. 11, in the locked position, the exterior flange 620 is configured for contact with a lower (distal) end surface 544 defined by the door body 500 (e.g., to reduce, if not entirely eliminate, gapping between the locking mechanism 600 and the door body 500 when the locking mechanism 600 is in the locked position).

Referring again to FIGS. 5 and 8, the rails 608 extend laterally (horizontally) from the body portion 606 of the locking mechanism 600 such that the rails 608 are positioned beneath the flanges 506 (i.e., between the flanges 506 and the supports 534). More specifically, in the embodiment of the disclosure shown throughout the figures, the body portion 606 includes a (first) rail 608*i* that is configured for positioning beneath the flanges 506*i*, 506*ii* within the channel 532*i*, and a (second) rail 608*ii* that is configured for positioning beneath the flanges 506*iii*, 506*iv* within the channel 532*ii*. The respective positioning of the rails 608*i*, 608*ii* within the channels 532*i*, 532*ii* restricts (if not entirely prevents) relative horizontal movement between the door body 500 and the locking mechanism 600 (i.e., movement of the locking mechanism 600 towards and/or away from the door body 500), while facilitating relative vertical movement (sliding) of the locking mechanism 600 relative to the door body 500 as the locking mechanism transitions between the locked and unlocked positions.

Referring to FIGS. 13 and 14 as well, the body portion 602 of the locking mechanism 600 defines a chamber 622 (FIG. 5) (e.g., a cavity 624) that accommodates the boss 504*iv* and the biasing member 700 such that the biasing member 700 extends into the chamber 622, as described in further detail below. The chamber 622 is defined at an upper end 626 (FIG. 13) by a (horizontal) end wall 628 that is configured for contact with the biasing member 700 to limit (vertical) movement of the locking mechanism 600 relative to the door body 500. Together with the biasing member 700, the end wall 628 of the locking mechanism 600 defines a range of (vertical) motion for the locking mechanism 600 (e.g., relative to the door body 500 and the biasing member 700) that prevents overextension of the locking mechanism 600, and inadvertent (e.g., accidental or unwanted) removal of the locking mechanism 600 from the door assembly 400.

Additionally, in certain embodiments, the body portion 606 of the locking mechanism 600 may also include a cutout 630 (FIG. 5) that is configured to receive the boss 504*iii* during movement of the locking mechanism 600 between the locked and unlocked positions, and/or a relief 632 that allows the overall weight of the locking mechanism 600 to be reduced.

With reference to FIGS. 5, 13, and 14, the deflector(s) 610 are configured for engagement with the biasing member 700 to facilitate horizontal movement of the biasing member 700 relative to the door body 500 during movement of the locking mechanism 600 between the locked position and the unlocked position. More specifically, as elaborated upon below, the deflector(s) 610 are configured to deflect the biasing member 700 inwardly (i.e., away from the door body 500, and towards the sealing member 800) as the locking mechanism 600 moves from the locked position to the unlocked position, and support the biasing member 700 during movement towards the door body 500 (and away from the sealing member 800) as the locking mechanism 600 moves from the unlocked position to the locked position. To support such movement, each deflector 610 includes an inclined (ramped) surface 634 that extends vertically upward from the body portion 606 of the locking mechanism 600 (towards the pivot member 132) at an angle δ (FIG. 13), and a generally planar end 636 that extends from the inclined surface in a generally vertical orientation.

In the particular embodiment of the disclosure shown throughout the figures, the locking mechanism 600 includes a pair of deflectors 610*i*, 610*ii* that are configured such that the angle & lies substantially within the range of approximately 30° to approximately 60°. It should be appreciated, however, that the number of deflectors 610 and/or the configuration of the deflector(s) 610 may be varied in alternate embodiments without departing from the scope of the present disclosure. For example, embodiments including a single deflector 610 would also be within the scope of the present disclosure, as would embodiments in which the deflector(s) 610 are configured such that the angle δ lies outside the range indicated above.

In certain embodiments, such as that seen in FIGS. 5, 13, and 14, for example, the locking mechanism 600 may further include one or more stiffening sections 638 (e.g., to reinforce and/or strengthen the locking mechanism 600). More specifically, in the illustrated embodiment, the locking mechanism 600 includes a pair of stiffening sections 638*i*, 638*ii* that are positioned vertically above (proximally of) the deflectors 610*i*, 610*ii*, respectively.

With continued reference to FIGS. 5, 13, and 14, the biasing member 700 will be discussed. The biasing member 700 may include any suitable material or combination of materials, and may be formed through any suitable method of manufacture (e.g., stamping, injection molding, machining, etc.). In the particular embodiment shown throughout the figures, for example, the biasing member 700 is integrally (e.g., monolithically) formed from a resilient (e.g., flexible) metallic material (e.g., spring steel, aluminum, etc.).

In the illustrated embodiment, the biasing member 700 is configured as a spring plate 704 that includes opposite upper and lower (first and second) ends 706*u*, 706*l*, and a body portion 708 that is positioned between the ends 706*u*, 706*l*. The upper end 706*u* is spaced vertically from the lower end 706*l* (i.e., closer to the pivot member 132), and is axially (vertically) fixed to the door body 500. More specifically, the upper end 706*u* includes a first section 710 defining the opening 702 that is configured to receive the post 528 extending from the door body 500, and a second section 712 defining an opening 714. The opening 714 is configured to receive the fastener 524*ii* such that the fastener 524*ii* extends through the opening 714 in the second section 712 of the biasing member 700, and into the boss 504*iv* to fixedly connect the biasing member 700 to the door body 500, whereby the second section 712 is supported by the boss 504*iv*. The second section 712 is spaced laterally inward from the first section 710 (i.e., the second section 712 is positioned closer to the sealing member 800) in generally parallel relation to the first section 710. The second section 712 is connected to the first section 710 by a (horizontal) flange 716 that is oriented in generally orthogonal relation to each of the sections 710, 712.

The body portion 708 of the biasing member 700 is generally linear in configuration and extends distally from the second section 712 of the upper end 706*u*. More specifically, the body portion 708 extends from the second section 712 at an angle γ (FIG. 13) such that the lateral (horizontal) distance between the lower end 706*l* and the sealing member 800 is greater than the lateral (horizontal) distance between the second section 712 and the sealing member 800.

The lower end 706*l* of the biasing member 700 includes a pair of wings 718*i*, 718*ii* that extend laterally (horizontally) from the body portion 708 such that the biasing member 700 includes an overall configuration that is generally T-shaped. The wings 718*i*, 718*ii* are configured for contact with the deflectors 610*i*, 610*ii* extending from the locking mechanism 600, respectively, during movement of the locking mechanism 600. Contact between the wings 718*i*, 718*ii* and the deflectors 610*i*, 610*ii* inhibits (if not entirely prevents) rotation of the biasing member 700 relative to the door body 500 during movement of the locking mechanism 600. However, as mentioned above, it is envisioned that the number of deflectors 610 included on the locking mechanism 600 may be varied in alternate embodiments of the disclosure (e.g., such that the locking mechanism 600 includes a single deflector 610 only). As such, embodiments of the biasing member 700 are also envisioned in which the biasing member 700 may include a single wing 718 only.

Referring to FIGS. 15 and 16 as well, during movement of the locking mechanism 600 between the locked position (FIG. 15) and the unlocked position (FIG. 16), by virtue of the fixed axial (vertical) connection between the upper end 706*u* of the biasing member 700 and the door body 500, the locking member 602 moves relative to the biasing member 700, which causes movement of the biasing member 700 from a normal (first, unbiased) position (FIGS. 5, 13, 15) to a deflected (second, biased) position (FIGS. 14, 16). More specifically, during movement of the locking mechanism 600 from the locked position to the unlocked position, as the biasing member is deflected, the biasing member 700 traverses the deflectors 610*i*, 610*ii* such that the wings 718*i*, 718*ii* travel (upwardly) across the inclined surfaces 634. To facilitate movement of the wings 718*i*, 718*ii* across the inclined surfaces 634, it is envisioned that the wings 718*i*, 718*ii* may define beveled (angled) upper surfaces 720*i*, 720*ii*, respectively, that are angled in correspondence with the inclined surfaces 634 (i.e., such that the angle defined by the beveled upper surfaces 720*i*, 720*ii* approximates or matches the angle δ (FIG. 13) defined by the inclined surfaces 634). As the biasing member 700 traverses the deflectors 610*i*, 610*ii*, the biasing member 700 is deflected away from the door body 500 (and towards the sealing member 800) along an axis of movement XB that extends in generally orthogonal relation to the longitudinal axis Y of the door assembly, thereby reducing the angle γ (FIG. 13). As seen in FIG. 14, when the locking mechanism 600 is in the unlocked position, the biasing member 700 is supported by the respective ends 636*l*, 636*ii* of the deflectors 610*i*, 610*ii* in a generally linear configuration such that the biasing member 700 extends in generally parallel relation to the longitudinal axis Y of the door assembly 400 (and the locking mechanism 600).

Oppositely, as the locking member 602 moves from the unlocked position to the locked position, the biasing member 700 traverses the deflectors 610*i*, 610*ii* such that the wings 718*i*, 718*ii* travel (downwardly) across the inclined surfaces 634. The biasing member 700 is, thus, returned to its normal configuration (FIGS. 5, 13, 15), which is facilitated by the inclusion of resilient material(s) in construction of the biasing member 700. As the normal configuration of the biasing member 700 is restored, the distance between the wings 718i, 718ii and the door body 500 is reduced, and the angle γ at which the body portion 708 of the biasing member 700 extends from the second section 712 is increased such that the biasing member 700 again extends at an angle to the longitudinal axis Y of the door assembly 400 (and at an angle to the locking mechanism 600).

As mentioned above and seen in FIGS. 13 and 14, the biasing member 700 is configured for receipt within the chamber 622 defined by the locking mechanism 600. When the locking mechanism 600 is fully extended (unlocked), the flange 716 connecting the sections 710, 712 of the upper end 706u of the biasing member 700 comes into contact with the end wall 628 defining the chamber 622. The flange 716, thus, provides a stop 722 (FIG. 14) that limits (vertical) travel of the locking mechanism 600.

Figure 17:
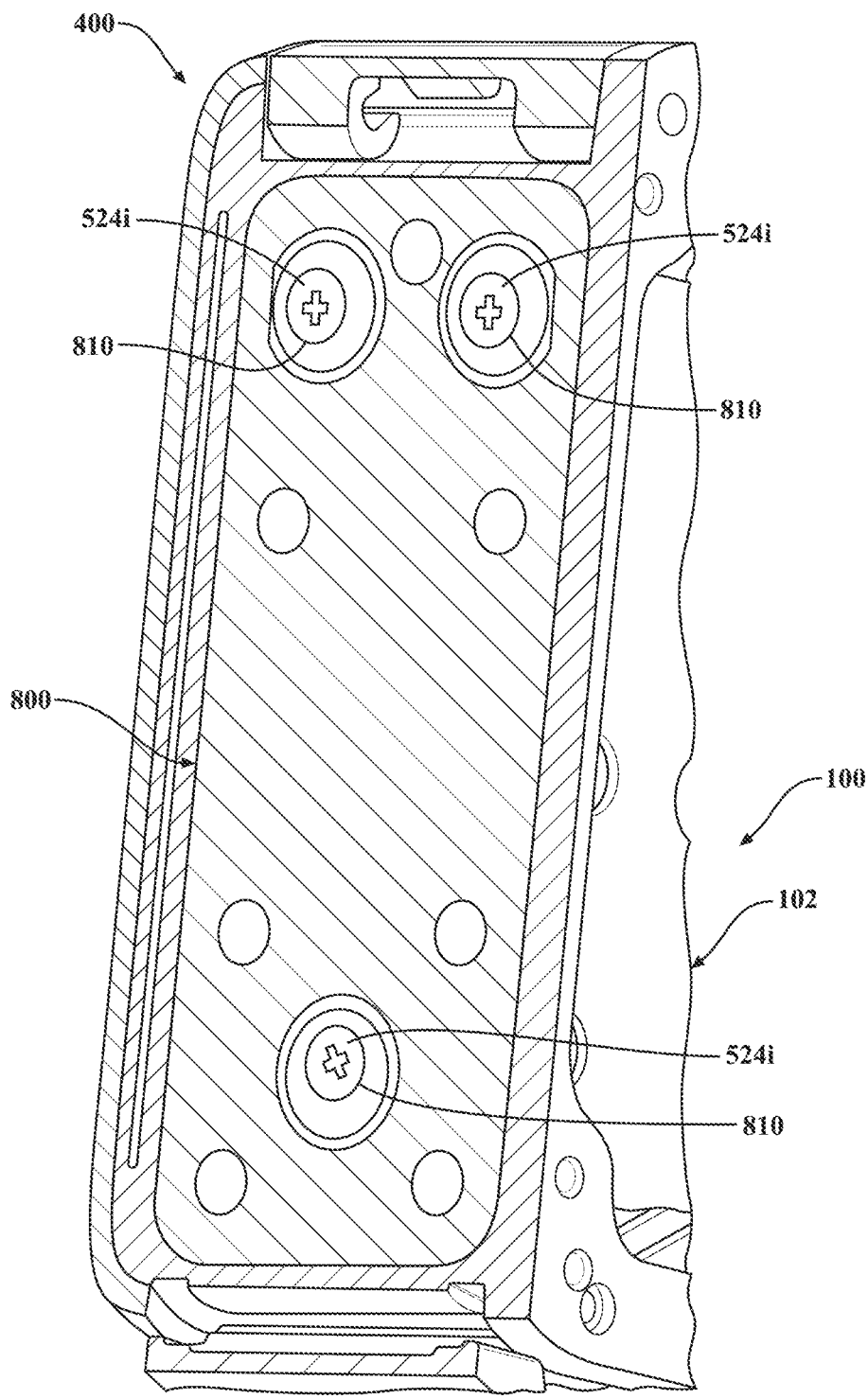
FIG. 17 is a partial, (vertical) cross-sectional view of the door assembly shown connected to the image capture device.

With reference now to FIGS. 4B, 5, and 17, the sealing member 800 will be discussed. FIG. 17 provides a partial, (vertical) cross-sectional view of the door assembly 400 shown connected to the body 102 of the image capture device 100. The sealing member 800 is configured in correspondence with the peripheral cavity 122 defined by the body 102 of the image capture device 100 such that the sealing member 800 is insertable into and removable from the peripheral cavity 122 during opening and closure of the door assembly 400. More specifically, in the illustrated embodiment, the sealing member 800 includes a pair of generally linear sidewalls 802i, 802ii; a pair of generally linear end walls 804i, 804ii that extend between the sidewalls 802i, 802ii; and radiused corner portions 806i-806iv. It should be appreciated, however, that the specific configuration of the sealing member 800 may be altered in various embodiments without departing from the scope of the present disclosure (e.g., depending upon the particular configuration of the image capture device 100, the peripheral cavity 122, etc.).

The sealing member 800 includes a resilient, compressible material to facilitate sealed engagement with the body 102 of the image capture device 100 upon closure of the door assembly 400, and, thus, the formation of a (waterproof) seal in the peripheral cavity 122. More specifically, as the door assembly 400 is closed, pressure is applied to the sealing member 800 as the sealing member 800 is compressed against the body 102 of the image capture device 100, which causes lateral (horizontal) and/or axial (vertical) expansion of the sealing member 800 to thereby seal against the body 102. It is envisioned that the sealing member 800 may include (e.g., may be formed from) any material or combination of materials suitable for the intended purpose of sealing the body 102 (e.g., the peripheral cavity 122) in the manner described herein. For example, in the particular embodiment of the disclosure illustrated throughout the figures, the sealing member 800 includes an outer layer 8080 (FIG. 8) that is formed from a (first) compressible material (e.g., silicone rubber), and an inner layer (core) 808i that is formed from a (second) material (e.g., a metallic material, polycarbonate, etc.) to increase rigidity and stability of the sealing member 800 and the door assembly 400. It should be appreciated, however, that, in alternate embodiments of the disclosure, it is envisioned that the material(s) used in construction of the sealing member 800 may be varied, and that the sealing member 800 may be formed from a single material only.

As seen in FIG. 5, the sealing member 800 is spaced inwardly from the locking mechanism 600 (i.e., further from the door body 500 and closer to the body 102 of the image capture device 100) and is integrated into the door assembly 400. More specifically, the sealing member 800 is fixedly connected to the door body 500 such that the locking mechanism 600 and the biasing member 700 are positioned between the door body 500 and the sealing member 800. To facilitate connection of the sealing member 800 to the door body 500, in the illustrated embodiment, the sealing member 800 includes a plurality of openings 810 that are configured to receive the fasteners 524i such that the fasteners 524i extend through the sealing member 800 into the bosses 504i, 504ii, 504iii, as mentioned above.

In certain embodiments of the disclosure, such as that shown throughout the figures, the door assembly 400 may further include the aforementioned spacer 900, which is seen in FIGS. 4A, 4B, and 5, for example. The spacer 900 is configured for positioning between the sealing member 800 and the body 102 of the image capture device 100, and, in the illustrated embodiment, is configured as a foam block 902. The spacer 900 may include (e.g., may be formed from) any material suitable for the intended purpose(s) of enhancing the seal formed between the sealing member 800 and the body 102 of the image capture device 100 upon closure of the door assembly 400; reducing (if not entirely eliminating) undesirable relative movement between the components of the door assembly 400; increasing shock absorption; and/or enhancing electrical connectivity between the components of the image capture device (e.g., connection of the battery 322).

To facilitate proper orientation of the spacer 900 relative to the sealing member 800, in certain embodiments, the sealing member 800 may include one or more raised ribs 812 (or other such projections or surface irregularities) on an inner face 814 thereof that collectively define a receiving space 816 for the spacer 900 to guide the spacer 900 into proper positioning. Additionally, or alternatively, it is envisioned that the spacer 900 may be secured to the sealing member 800, such as, for example, through the use of one or more mechanical fasteners (e.g., screws), an adhesive, etc.

With reference now to FIGS. 5, 6, 8, and 13-16, assembly of the door assembly 400 will be discussed. Initially, the biasing member 700 is secured to the door body by positioning the post 528 within the opening 702 defined by the upper end 706u of the biasing member 700, and by inserting the fastener 524ii into the boss 504iv, whereby the body portion 708 of the biasing member 700 is supported by the inclined surface 526 (FIG. 6) defined by the boss 504iv. Upon connection of the biasing member 700 to the door body 500, to reduce the overall profile of the door assembly 400 and/or the weight of the door assembly, the biasing member 700 may be positioned within a cavity 546 (FIG. 6) defined by the door body 500.

After connection of the biasing member 700 to the door body 500, the locking mechanism 700 is positioned such that the rail 608i (FIG. 8) is positioned beneath the flanges 506i, 506ii within the channel 532i, and the rail 608ii is positioned beneath the flanges 506iii, 506iv within the channel 532ii. When so positioned, the body portion 606 of the locking mechanism 600 overlays the first section 710 of the upper end 706u of the biasing member 700 within a space 640 (FIG. 13) between the flange 506 of the biasing member 700 and the bosses 504i, 504ii, and the wings 718i, 718ii included at the lower end 706l of the biasing member 700 are respectively positioned adjacent to (e.g., in contact with) the deflectors 610i, 610ii.

Thereafter, the sealing member 800 can be connected to the door body 500 via insertion of the fasteners 524i through the openings 810 and into the bosses 504i, 504ii, 504iii on the door body 500, and the spacer 900 can be connected to the sealing member 800 (e.g., by securing the spacer 900 within the receiving space 816 defined on the inner face 814 of the sealing member 800 by the ribs 812). Upon connection of the sealing member 800 to the door body 500, a lower end 818*i* of the sealing member 800 is received within the groove 618 defined by the locking member 602 (e.g., the tooth 614) and the end wall 616 of the locking mechanism 600.

With reference now to FIGS. 4A-17, use and operation of the door assembly 400 will be discussed. When necessary or desired, the door assembly 400 can be moved from the closed position (FIG. 4D) to the open position (FIGS. 4A-4C) (e.g., to remove and/or replace the power source 124 (e.g., the battery 322) with a larger power source 124, and/or to provide access to the accessory port 126, the I/O interface 114, the USB-C connector 128, etc.). To allow for movement of the door assembly 400 from the closed position to the open position, the locking mechanism 600 is moved from the locked position (FIGS. 9, 11, 13, 15) into the unlocked position (FIGS. 10, 12, 14, 16), such as, for example, via the manual application of force to the tactile member 604. Due to the connection between the door body 500, the biasing member 700, and the sealing member 800 established by the fasteners 524*i*, 524*ii* (FIG. 5), the locking mechanism 600 is movable relative to each of the door body 500, the biasing member 700, and the sealing member 800 during locking and unlocking. The door body 500, the biasing member 700, and the sealing member 800, thus, collectively constitute a stationary subassembly, and the locking mechanism 600 constitutes a movable subassembly.

The biasing member 700 resists movement of the locking mechanism 600 via contact between the wings 718*i*, 718*ii* and the deflectors 610*i*, 610*ii*, respectively, (FIGS. 5, 13-16) until a threshold force is applied to the locking mechanism 600 (e.g., via the tactile member 604), which inhibits (if not entirely prevents) accidental or unwanted movement of the locking mechanism 600 into the unlocked position (e.g., in the event that the image capture device 100 is dropped), and, thus, inadvertent (e.g., accidental or unwanted) opening of the door assembly 400. Upon application of the threshold force, the lower end 706*i* of the biasing member 700 is deflected inwardly (i.e., towards the sealing member 800) as the wings 718*i*, 718*ii* begin to travel (upwardly) across the inclined surfaces 634 defined by the deflectors 610*i*, 610*ii*, thereby reducing the angle γ (FIG. 13) until the wings 718*i*, 718*ii* come to rest upon the respective ends 512*i*, 512*ii* of the deflectors 610*i*, 610*ii* upon full extension of the locking mechanism 600, as seen in FIGS. 14, 16. As the locking member 602 moves (slides) distally (i.e., away from the pivot member 132), the locking member 602 is removed from the receptacle 140 (FIGS. 9, 10) in the housing 102 of the image capture device 100.

After movement of the locking mechanism 600 into the unlocked position, and removal of the locking member 602 from the receptacle 140, the door assembly 400 can be rotated in relation to (i.e., away from) the body 102 of the image capture device 100 into the open position about the axis of rotation XR extending through the pivot member 132, and through the clips 508 of the engagement structure 502 on the door body 500.

If necessary or desired, the door assembly 400 can then be separated from the body 102 of the image capture device 100. For example, a pulling force can be applied to the door assembly 400 to deflect the arms 510*i*, 510*ii* of the clips 508 such that the clips 508 can be separated from the pivot member 132. Alternatively, the door assembly 400 can be rotated beyond the (generally orthogonal) threshold position seen in FIGS. 4A, 4B such that the bearing surface 518 (FIG. 7) defined at the ends 512*i* of the arms 510*i* of each clip 508 contacts the bearing surface 136 defined by the body 102 of the image capture device 100. Upon such contact between the bearing surfaces 518, 136, as mentioned above, the continued application of force results in the creation of an outwardly-directed force (in the direction indicated by arrow 1 (FIG. 7)) that will cause the clip 508 to separate from the pivot member 132, thus removing the door assembly 400 from the body 102 of the image capture device 100.

To reconnect the door assembly 400 to the body 102 of the image capture device 100, the pivot member 132 is re-inserted into the clips 508. During reconnection, the resilient material used in construction of the clips 508 allows for deflection of the clips 508. More specifically, the pivot member 132 deflects the arm 510*ii* of each clip 508 outwardly (away from the arm 510*i*), during which, the pivot member 132 may be resiliently deflected via forces collectively applied to the pivot member 132 by the clips 508 and the detent 522 (FIG. 6). Upon seating of the pivot member 132 within the channel 514 defined by each clip 508, the pivot member 132 is returned to its normal (linear) configuration.

After reconnection of the door assembly 400, the door assembly 400 can be rotated in relation to (i.e., towards) the body 102 of the image capture device 100 into the closed position. During closure of the door assembly 400, the sealing member 800 and the spacer 900 are compressed (e.g., via contact with the portions of the body 102 defining the peripheral cavity 122) so as to seal the door assembly 400 and the body 102. Once closed, the locking mechanism 600 can be moved into the locked position (FIGS. 9, 11, 13, 15), during which, the lower end 706*i* of the biasing member 700 moves outwardly (i.e., away from the sealing member 800) as the wings 718*i*, 718*ii* travel (downwardly) across the inclined surfaces 634 defined by the deflectors 610*i*, 610*ii*, thereby increasing the angle γ (FIG. 13). As the locking mechanism 600 moves (slides) proximally (i.e., towards the pivot member 132), the locking member 602 (FIGS. 9, 10) is re-inserted into the receptacle 140 in the housing 102 of the image capture device 100 to thereby inhibit (if not entirely prevent) inadvertent (e.g., accidental or unwanted) opening of the door assembly 400 (e.g., in the event that the image capture device 100 is dropped).

During movement of the locking mechanism 600 into the locked position, it is envisioned that contact between the wings 718*i*, 718*ii* and the deflectors 610*i*, 610*ii* may facilitate (e.g., encourage) proximal (upward) movement of the locking mechanism 600 (i.e., towards the pivot member 132). More specifically, due to the resilient construction of the biasing member 700, and the angled configuration of the deflectors 610*i*, 610*ii*, it is envisioned that the biasing member 700 may apply a force to the locking mechanism 600 during return of the biasing member 700 to its normal position (FIGS. 13, 15) that may urge the locking member 602 proximally (upwardly).

It is envisioned that the sliding motion of the locking member 602 during the locking and unlocking of the locking mechanism 600 may improve the user feel and the overall user experience, in that unlocking of the door assembly 400, opening of the door assembly 400, and/or removal of the door assembly 400 from the body 102 of the image capture device 100 may be accomplished via a single motion (i.e., distal (downward) movement of the locking mechanism 600). To further improve the user experience, in certain embodiments, it is envisioned that an additional biasing member (e.g., a spring) (not shown) may be positioned between the body 102 of the image capture device and the door assembly 400 to urge the door assembly 400 into the open position once the locking mechanism 600 is moved into the unlocked position. In such embodiments, it is thus envisioned that the door assembly 400 may be unlocked and opened by a single motion (i.e., by moving the locking mechanism 600 into the unlocked position).

Figure 18:
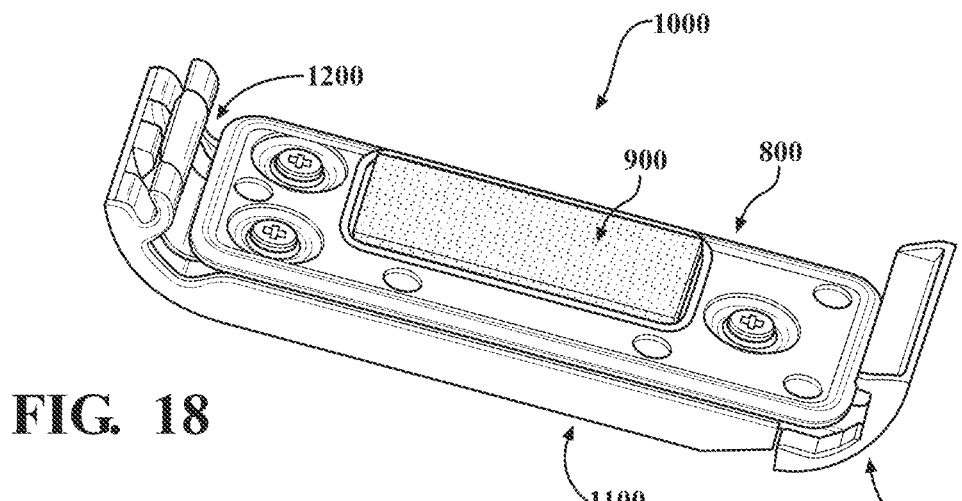
FIG. 18 is a perspective view of an alternate embodiment of the door assembly, which includes a door body; the locking mechanism, the biasing member, the sealing member, and the spacer seen in FIGS. 4A-17; and a clip.
Figure 19:
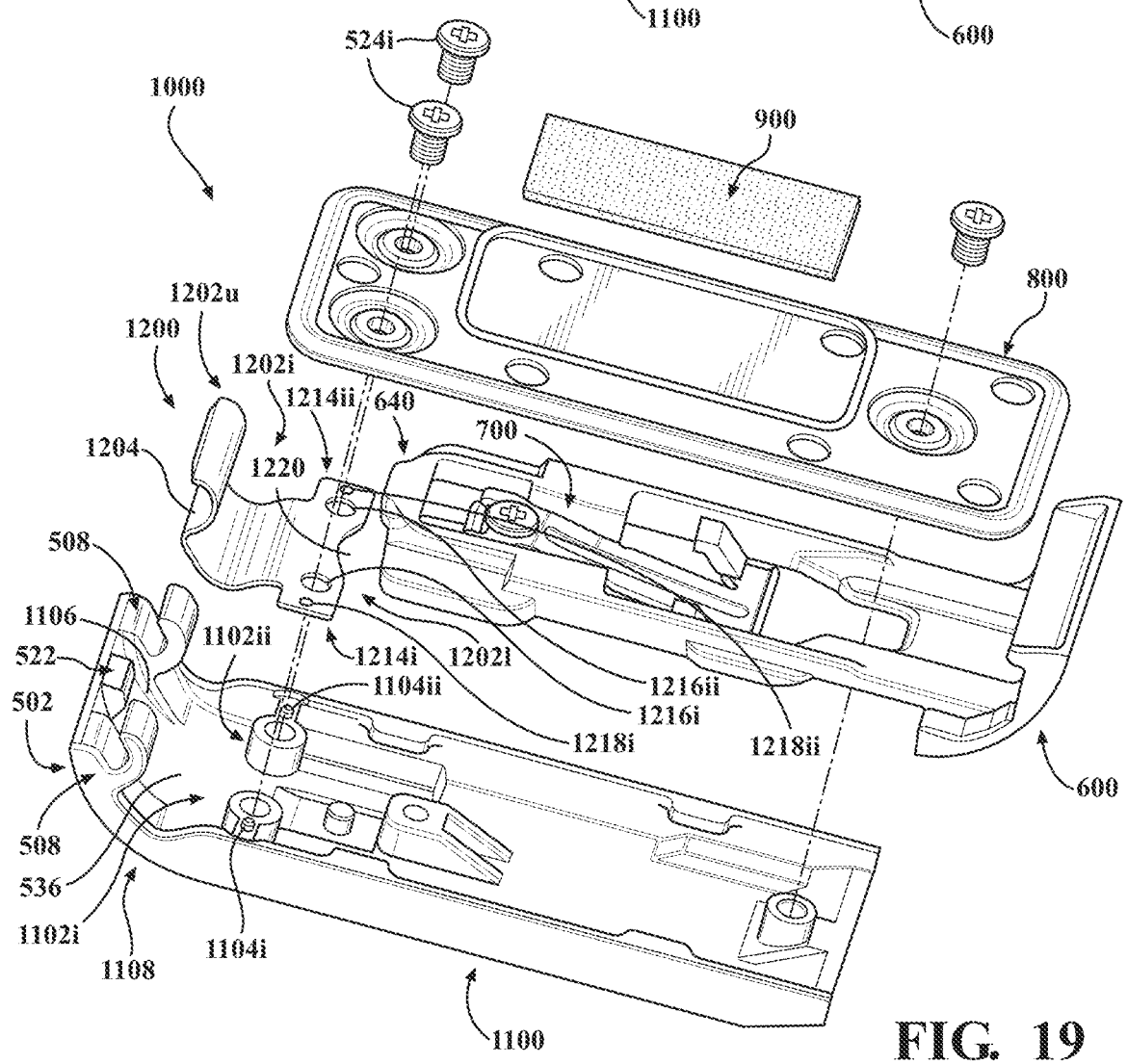
FIG. 19 is a perspective view of the door assembly seen in FIG. 18 with parts separated.
Figure 20:
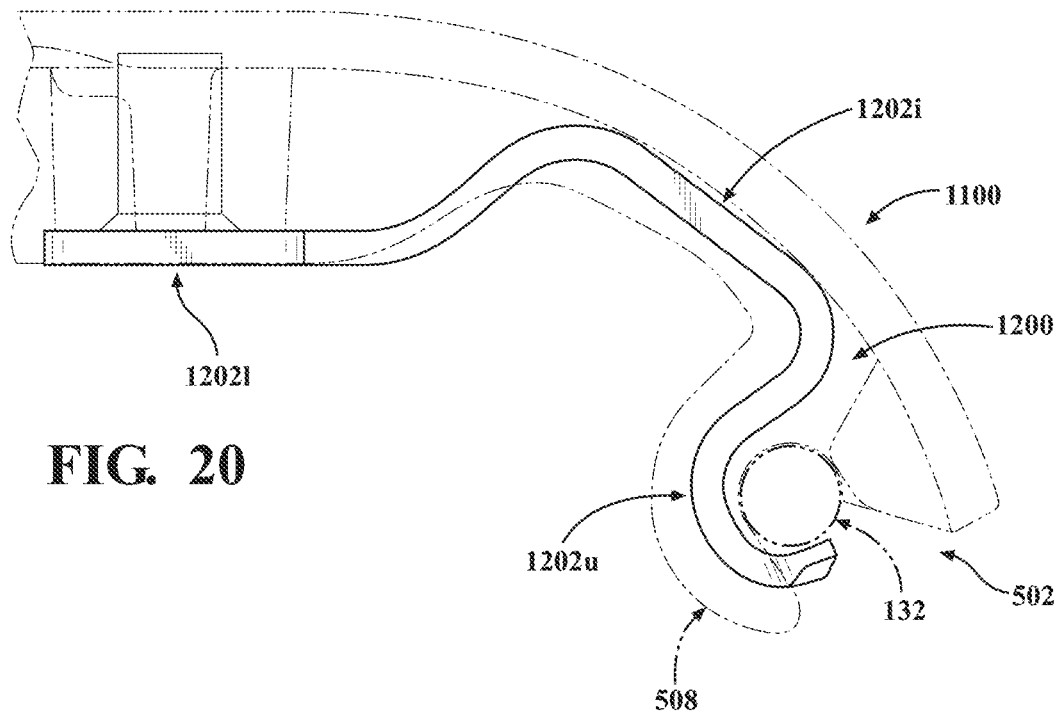
FIG. 20 is a side, plan view illustrating connection of the clip to the door body (shown in phantom).

With reference now to FIGS. 18-20, an alternate embodiment of the door assembly will be discussed, which is identified by the reference character 1000. More specifically, FIG. 18 provides a perspective view of the door assembly 1000, which includes a door body 1100; the aforementioned locking mechanism 600, biasing member 700, sealing member 800, and spacer 900; and a clip 1200; FIG. 19 provides a perspective view of the door assembly 1000 shown with parts separated; and FIG. 20 provides a side, plan view illustrating connection of the clip 1200 to the door body 1100. The door assembly 1000 is substantially similar to the door assembly 400 discussed above, but for the configuration of the door body 1100 and inclusion of the clip 1200, and, accordingly, will only be discussed with respect thereto in the interest of brevity.

The door body 1100 is substantially similar to the door body 500 discussed above, but for the configuration of the bosses, which are identified by the reference characters 1102$i$, 1102$ii$. The bosses 1102$i$, 1102$ii$ are each configured to receive one of the fasteners 524$i$ and respectively include detents 1104$i$, 1104$ii$ that are configured for engagement (contact) with the clip 1200, as described in further detail below.

The clip 1200 is positioned vertically above the locking mechanism 600 in generally adjacent relation to the engagement structure 502 and is configured to support and maintain secured engagement between the pivot member 132 (FIG. 20) and the door body 1100 (e.g., the engagement structure 502). The clip 1200 may include any suitable material or combination of materials and may be formed through any suitable method of manufacture (e.g., stamping, injection molding, machining, etc.). In the particular embodiment shown throughout the figures, for example, the clip 1200 is integrally (e.g., monolithically) formed from a resilient (e.g., flexible) metallic material (e.g., spring steel, aluminum, etc.) and includes an upper (first) portion 1202$u$; a lower (second) portion 1202$l$; and an intermediate portion 1202$i$ that extends between the respective upper and lower portions 1202$u$, 1202$l$.

The upper portion 1202$u$ is configured for positioning within a space 1106 defined between the clips 508 of the engagement structure 502. More specifically, the upper portion 1202$u$ defines a transverse (horizontal) dimension (e.g., a width) that is less than that defined by the space 1106 so as to inhibit (if not entirely prevent) contact between the clips 508 and the upper portion 1202$u$ of the clip 1200. The upper portion 1202$u$ includes a generally arcuate configuration defining a channel 1204 that is configured to receive the pivot member 132 so as to bias (urge) the pivot member 132 outwardly (i.e., towards the detent 122) and thereby reduce (if not entirely eliminate) relative movement between the pivot member 132 and the engagement structure 502.

Figure 21:
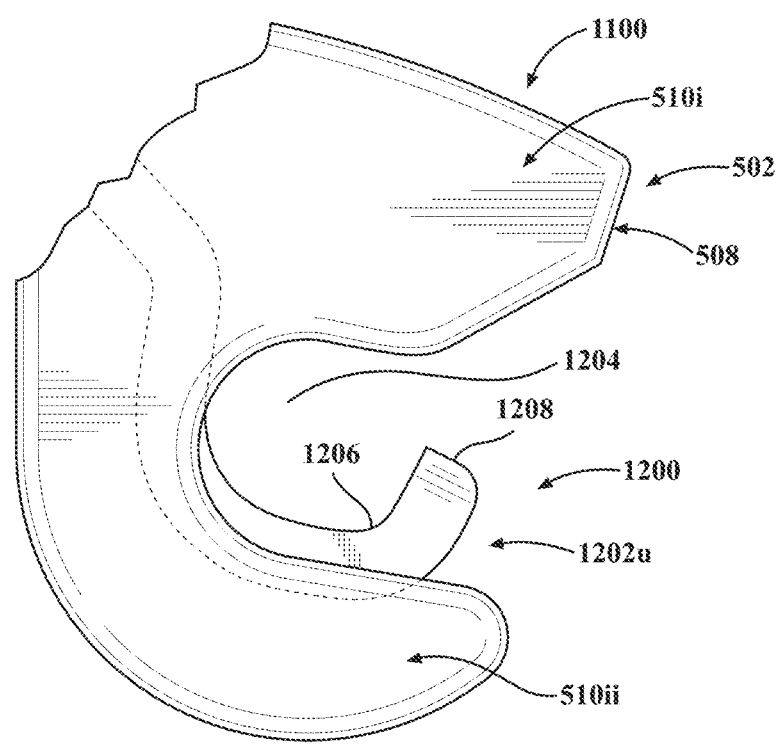
FIG. 21 is a side, plan view illustrating connection of the clip to the door body according to an alternate embodiment of the disclosure.

To further facilitate engagement (contact) between the clip 1200 and the pivot member 132, it is envisioned that the upper portion 1202$u$ may include a bend 1206 defining a finger 1208, as seen in FIG. 21, which provides a partial, side view of the clip 1200 shown connected to the door body 1100 according to an alternate embodiment of the disclosure. The finger 1208 extends outwardly (i.e., towards the arm 510$i$ of the clip 508 and away from the arm 510$ii$) such that the clip 1200 further circumscribes the pivot member 132 upon receipt within the channel 1204. In such embodiments, it is envisioned that the upper portion 1202$u$ of the clip 1200 may be deflected inwardly (i.e., away from the arm 510$i$ and towards the arm 510$ii$) via engagement (contact) between the finger 1208 and the pivot member 132 during connection to the pivot member 132 to increase the bias applied to the pivot member 132 by the clip 1200.

The upper portion 1202$u$ defines a curvature that is similar to that defined by the engagement structure 502 (e.g., the clips 508). For example, as seen in FIG. 20, it is envisioned that the curvature defined by the upper portion 1202$u$ may be slightly greater than that defined by the engagement structure 502 (e.g., to facilitate more secured engagement between the pivot member 132 and the upper portion 1202$u$ of the clip 1200).

The intermediate portion 1202$i$ of the clip 1200 extends from the upper portion 1202$u$ and includes a configuration that substantially approximates the contour defined by the inner surface 536 of the door body 1100. More specifically, as can be appreciated through reference to FIGS. 18 and 19, the intermediate portion 1202$i$ defines a curvature that is substantially similar (or identical) to the curvature defined by an upper end 1108 of the door body 1100. In certain embodiments, it is envisioned that the intermediate portion 1202$i$ may be configured for contact with the inner surface 536 of the door body 1100 such that that intermediate portion 1202$i$ of the clip 1200 is supported by the inner surface 536 of the door body 1100 (e.g., during closure of the door assembly 1000) to facilitate uniform and accurate force distribution across the clip 1200.

As seen in FIG. 19, for example, the curvatures defined by the upper portion 1202$u$ of the clip 1200 and the intermediate portion 1202$i$ of the clip 1200 extend in different (e.g., opposite) directions. More specifically, whereas the curvature defined by the upper portion 1202$u$ extends generally away from the inner surface 536 of the door body 1100, the curvature defined by the intermediate portion 1202$i$ extends generally towards the inner surface 536 of the door body 1100.

Figure 22:
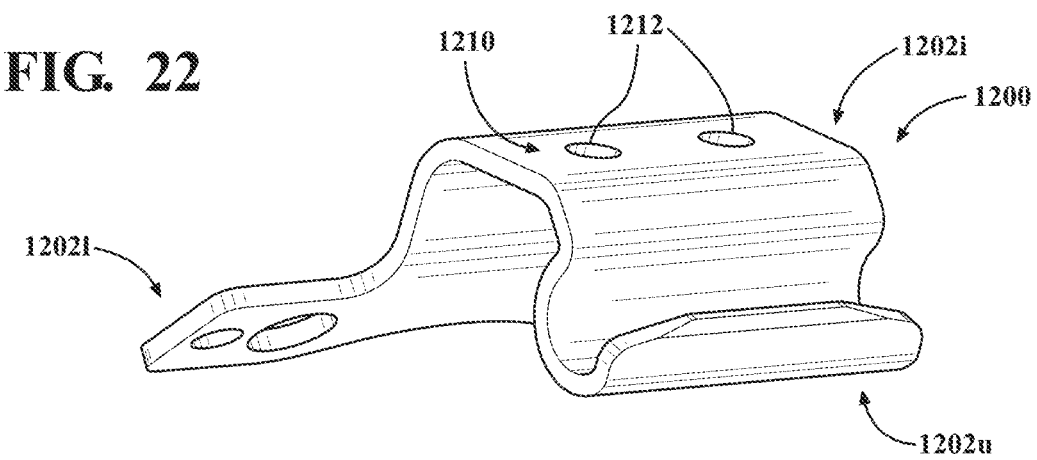
FIG. 22 is a perspective view of the clip according to an alternate embodiment of the disclosure.

With reference to FIG. 22, which provides a perspective view of the clip 1200 according to an alternate embodiment of the disclosure, it is envisioned that the intermediate portion 1202$i$ of the clip 1200 may include one or more weakened sections 1210 to facilitate controlled deformation (flexure) of the clip 1200 (e.g., during opening and closing of the door assembly 1000). In the particular embodiment seen in FIG. 22, for example, the weakened section 1210 includes a plurality of apertures 1212. It should be appreciated, however, that the configuration of the weakened section 1210 may varied in any suitable manner. For example, the weakened section 1210 may include one or more cutouts, reliefs, score lines, etc., either instead of, or in addition to, the apertures 1212.

With reference again to FIGS. 18-20, the lower portion 1202$l$ of the clip 1200 extends from the intermediate portion 1202$i$ and includes a generally planar (e.g., flat) configuration defining wings 1214$i$, 1214$ii$. The wings 1214$i$, 1214$ii$ extend laterally (horizontally) outward from the intermediate portion 1202$i$ and are configured for engagement (contact) with the bosses 1102$i$, 1102$ii$ on the door body 1100. The bosses 1102$i$, 1102$ii$ support the clip 1200 such that the upper portion 1202$u$ is cantilevered and floats freely between the clips 508, which allows the clip 1200 to flex (or otherwise deform) between the respective upper and lower portions 1202$u$, 1202$l$. More specifically, the lower portion 1202$l$ includes openings 1216$i$, 1216$ii$ that are configured to receive the fasteners 524*i* such that the fasteners 524*i* extend through the sealing member 800 and into the bosses 1102*i*, 1102*ii* through the openings 1216*i*, 1216*ii*. Insertion of the fasteners 524*i* into the bosses 1102*i*, 1102*ii* through the respective openings 1216*i*, 1216*ii* fixedly secures the clip 1200 to the door body 1100 to limit (if not entirely prevent) rotational, axial (vertical), and/or transverse (horizontal) movement of the clip 1200 relative to the door body 1100 (e.g., movement of the clip 1200 towards and away from the pivot member 132 and/or movement of the clip 1200 towards and away from the sealing member 800).

Additionally, the lower portion 1202*l* includes openings 1218*i*, 1218*ii*, which are configured to receive the detents 1104*i*, 1104*ii*, respectively, to provide a location feature that facilitates proper location and/or orientation of the clip 1200 in relation to the door body 1100.

As seen in FIG. 19, for example, in certain embodiments, the lower end 1202*l* of the clip 1200 may include a relief 1220 that is configured to accommodate the locking mechanism 600. In the specific embodiment of the clip 1200 illustrated, the relief 1220 includes an arcuate configuration that receives an upper end 640 of the locking mechanism 600. It should be appreciated, however, that the particular configuration of the relief 1220 may be altered in various embodiments of the disclose, or eliminated altogether, depending upon the particular configuration of the locking mechanism 600.

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A door assembly for an image capture device, the door assembly comprising:
    a body defining a peripheral cavity; and
    a door assembly configured to close and seal the peripheral cavity, wherein the door assembly is movable between an open position and a closed position and includes:
        a door body including an engagement structure configured for removable connection to the body of the image capture device;
        a locking mechanism linearly slidable in relation to the door body along a first axis of movement extending in generally parallel relation to a longitudinal axis of the door assembly between a locked position and an unlocked position;
        a biasing member configured for engagement with the locking mechanism to resist movement of the locking mechanism from the locked position to the unlocked position until a threshold force is applied to the locking mechanism, whereupon the biasing member is repositioned from a normal position into a deflected position along a second axis of movement extending in transverse relation to the first axis of movement, wherein the biasing member extends at a first angle in relation to the locking mechanism in the normal position and at a second angle in relation to the locking mechanism in the deflected position; and
        a sealing member configured to sealingly engage the image capture device upon closure of the door assembly, wherein the sealing member is secured to the door body such that the locking mechanism and the biasing member are positioned between the door body and the sealing member.

2. The door assembly of claim 1, wherein the first angle is greater than the second angle.

3. The door assembly of claim 2, wherein the biasing member extends in generally parallel relation to the longitudinal axis of the door assembly in the deflected position.

4. The door assembly of claim 3, wherein the locking mechanism includes:
   a first deflector defining a first angled surface; and
   a second deflector defining a second angled surface, wherein the first deflector and the second deflector are spaced laterally from each other along a width of the door assembly.

5. The door assembly of claim 4, wherein the biasing member includes:
   a first wing configured for contact with the first angled surface such that the first wing traverses the first deflector during movement of the locking mechanism between the normal position and the deflected position; and
   a second wing configured for contact with the second angled surface such that the second wing traverses the second deflector during movement of the locking mechanism between the normal position and the deflected position.

6. An image capture device comprising:
   a body; and
   a door assembly movable between an open position and a closed position about a first axis, wherein the door assembly includes:
      a door body having an upper end configured for connection to the image capture device and a lower end;
      a locking mechanism linearly movable in relation to the door body between a locked position and an unlocked position, wherein the locking mechanism is configured for movement towards the lower end during movement from the locked position into the unlocked position; and
      a biasing member configured to resist movement of the locking mechanism from the locked position to the unlocked position until a threshold force is applied to the locking mechanism, wherein the biasing member includes opposite ends spaced along a second axis transverse in relation to the first axis.

7. The image capture device of claim 6, wherein the locking mechanism is movable in relation to the biasing member as the locking mechanism moves between the locked position and the unlocked position.

8. The image capture device of claim 7, wherein the biasing member is fixedly connected to the door body.

9. The image capture device of claim 7, wherein the locking mechanism contacts the biasing member during repositioning between the locked position and the unlocked position.

10. The image capture device of claim 9, wherein contact between the locking mechanism and the biasing member repositions the biasing member from a normal position into a deflected position.

11. The image capture device of claim 10, wherein the biasing member extends at a first angle in relation to the locking mechanism in the normal position and at a second angle in relation to the locking mechanism in the deflected position.

12. The image capture device of claim 11, wherein the first angle is greater than the second angle.

13. The image capture device of claim 12, wherein the biasing member extends in generally parallel relation to a longitudinal axis of the door assembly in the deflected position.

14. The image capture device of claim 10, wherein the locking mechanism includes:
    a first deflector; and
    a second deflector spaced laterally from the first deflector along a width of the door assembly.

15. The image capture device of claim 14, wherein the biasing member includes:
    a first wing configured for contact with the first deflector; and
    a second wing configured for contact with the second deflector, wherein the first wing traverses the first deflector during movement of the locking mechanism between the normal position and the deflected position, and the second wing traverses the second deflector during movement of the locking mechanism between the normal position and the deflected position.

16. A door assembly for an image capture device, the door assembly comprising:
    a door body having a first end configured for connection to the image capture device and a second end;
    a locking mechanism movable in relation to the door body along a first axis to thereby lock and unlock the door assembly, wherein the locking mechanism is configured for movement towards one of the first end and the second end to unlock the door assembly; and
    a biasing member configured for engagement with the locking mechanism to resist movement of the locking mechanism until a threshold force is applied to the locking mechanism, whereupon the biasing member is repositioned along a second axis extending in transverse relation to the first axis.

17. The door assembly of claim 16, wherein the biasing member is configured for contact with the locking mechanism to define a range of relative motion between the locking mechanism and the door body.

18. The door assembly of claim 17, wherein the biasing member includes:
    a first section; and
    a second section spaced inwardly from the first section along a width of the image capture device, wherein the first section and the second section are connected by a flange oriented in generally orthogonal relation thereto.

19. The door assembly of claim 18, wherein the flange is configured for contact with the locking mechanism to limit travel thereof.

20. The door assembly of claim 19, wherein the flange extends into the locking mechanism.

* * * * *